US009860364B2

(12) United States Patent
Woloshyn

(10) Patent No.: US 9,860,364 B2
(45) Date of Patent: *Jan. 2, 2018

(54) METHOD AND APPARATUS FOR ANNOTATING A CALL

(71) Applicant: ZENO HOLDINGS LLC, Plano, TX (US)

(72) Inventor: Timothy D. T. Woloshyn, San Francisco, CA (US)

(73) Assignee: Zeno Holdings LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,763

(22) Filed: Oct. 16, 2016

(65) Prior Publication Data

US 2017/0104862 A1 Apr. 13, 2017

Related U.S. Application Data

(63) Continuation of application No. 14/834,442, filed on Aug. 25, 2015, now Pat. No. 9,473,618, which is a continuation of application No. 14/294,495, filed on Jun. 3, 2014, now Pat. No. 9,118,773, which is a continuation of application No. 13/798,009, filed on Mar. 12, 2013, now Pat. No. 8,750,836, which is a
(Continued)

(51) Int. Cl.
*H04M 1/725* (2006.01)
*H04W 4/12* (2009.01)
*H04L 12/58* (2006.01)
*G06F 3/0488* (2013.01)
*G06F 17/24* (2006.01)

(52) U.S. Cl.
CPC ........ *H04M 1/7255* (2013.01); *G06F 3/0488* (2013.01); *G06F 17/241* (2013.01); *H04L 51/066* (2013.01); *H04M 1/72552* (2013.01); *H04W 4/12* (2013.01)

(58) Field of Classification Search
CPC ........... H04M 1/7255; H04M 1/72552; G06F 17/241; G06F 3/0488; H04W 4/12
USPC .......................................... 455/412.1, 412.2
See application file for complete search history.

(56) References Cited

U.S. PATENT DOCUMENTS

| 7,788,104 B2 * | 8/2010 | Matsuo .................. H04M 1/21 379/88.14 |
| 7,917,584 B2 * | 3/2011 | Arthursson ........... G06F 3/0486 455/558 |

(Continued)

*Primary Examiner* — Shahriar Behnamian
(74) *Attorney, Agent, or Firm* — Joe Zheng

(57) ABSTRACT

Various aspects disclosed herein are directed to different types of personal assistant techniques for facilitating call event notation, tagging, calendaring, and etc., particularly those implemented on mobile communication devices. Users of mobile devices are provided with a relatively easy way to record and organize personal notes relating to one or more selected telephone conversations conducted by the user. Users can also manage notes, tasks, and schedule items related to the user's contacts and social network(s). In at least one embodiment, a Mobile Application running on a user's mobile device may be configured or designed to automatically detect an end of phone call event at the mobile device, and to automatically display a "pop-up" dialog GUI prompting the user to record a personalized note or other content (if desired), to be associated with the phone call which just ended.

20 Claims, 14 Drawing Sheets

Related U.S. Application Data continuation of application No. 13/494,025, filed on Jun. 12, 2012, now Pat. No. 8,417,233.

(60) Provisional application No. 61/496,460, filed on Jun. 13, 2011.

(56) References Cited

U.S. PATENT DOCUMENTS

| | | | | |
|---|---|---|---|---|
| 7,996,473 | B2* | 8/2011 | Braam | G06Q 10/107 709/206 |
| 8,140,627 | B2* | 3/2012 | Lasensky | G06F 9/4411 379/88.13 |
| 2002/0154766 | A1* | 10/2002 | Campos | H04M 1/0249 379/433.01 |
| 2007/0112571 | A1* | 5/2007 | Thirugnana | H04M 1/274516 704/270 |
| 2009/0119100 | A1* | 5/2009 | Akella | H04M 1/72522 704/235 |
| 2010/0217600 | A1* | 8/2010 | Lobzakov | G10L 13/00 704/260 |
| 2010/0234072 | A1* | 9/2010 | Ambiru | H04M 1/72552 455/563 |
| 2011/0287810 | A1* | 11/2011 | Zelber | H04M 1/56 455/566 |

* cited by examiner

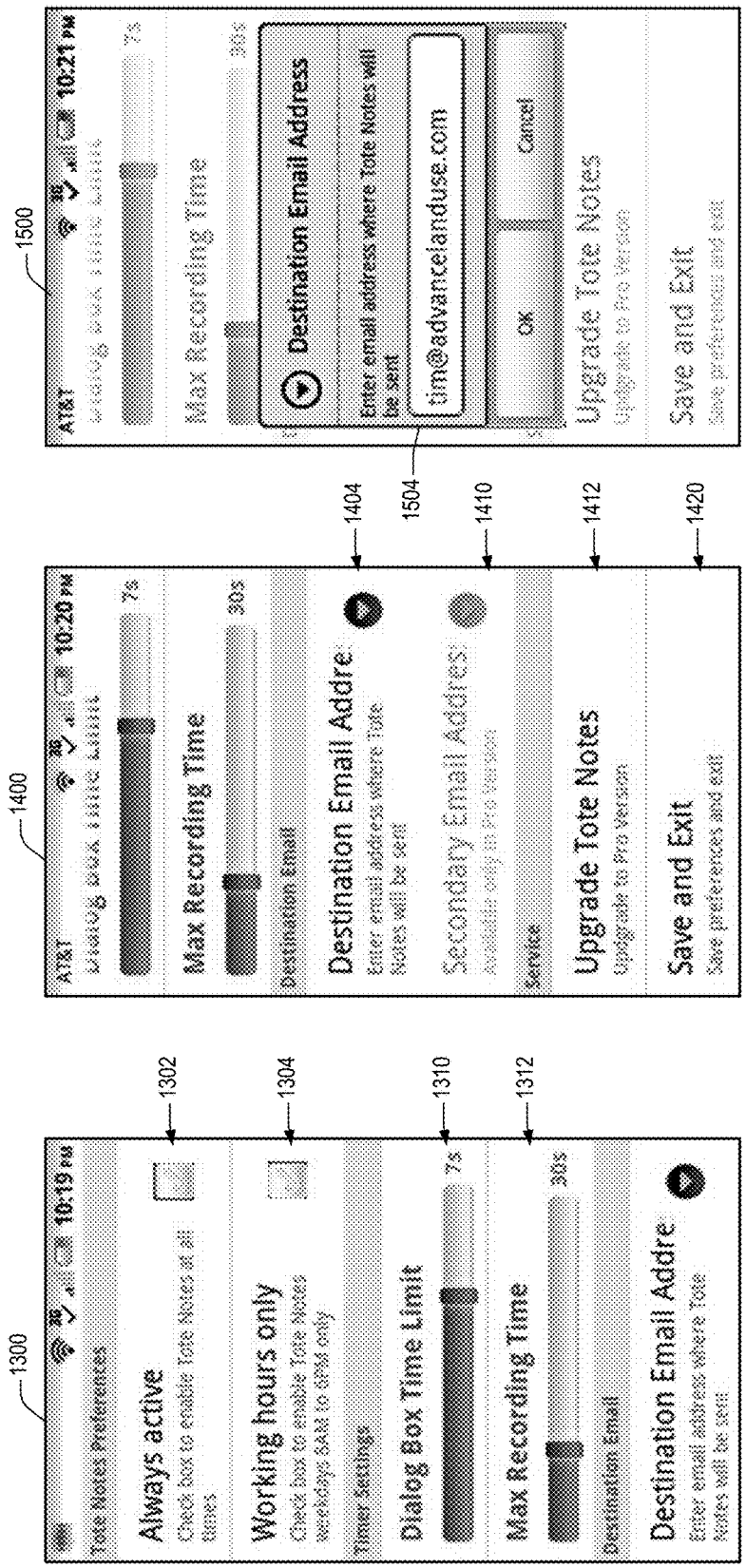

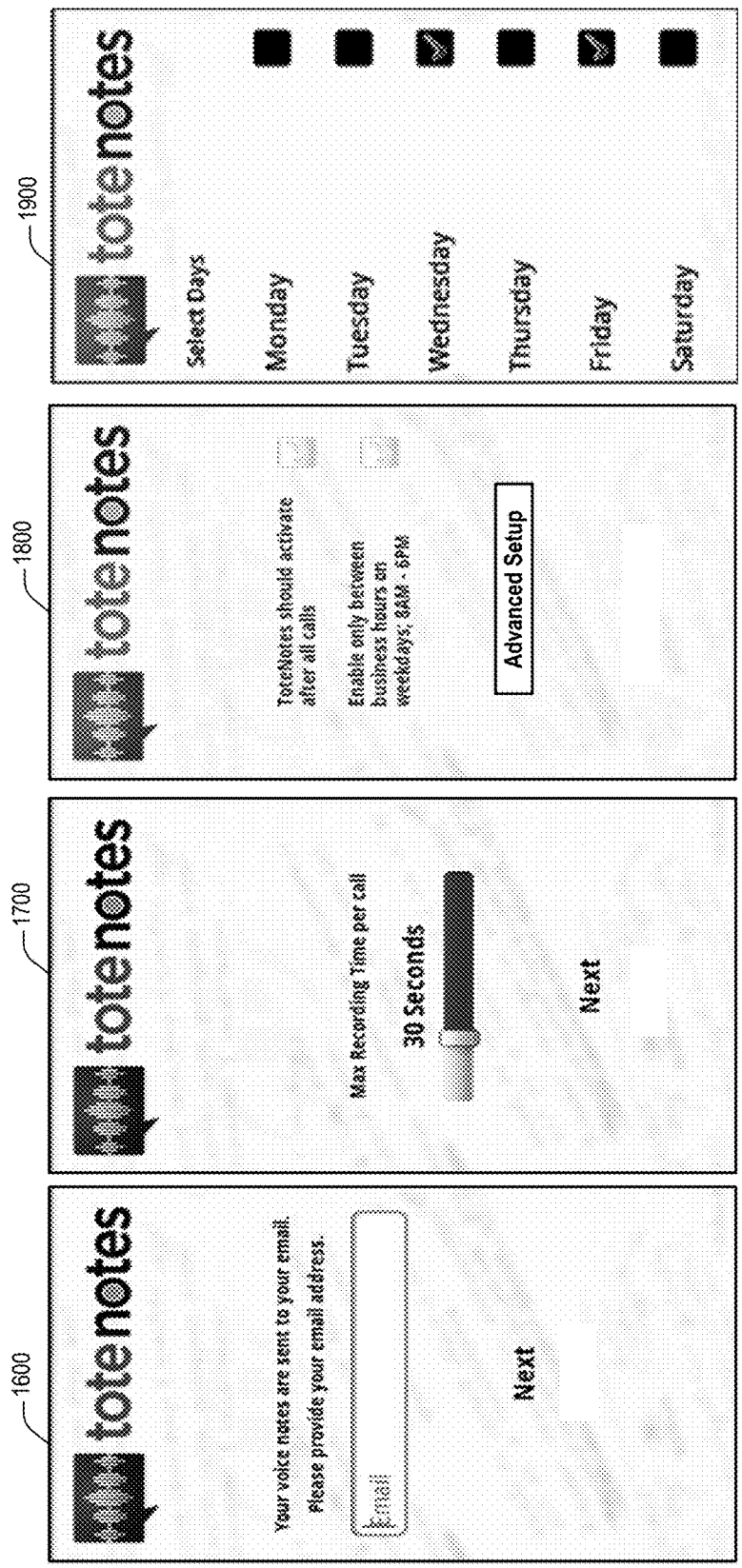

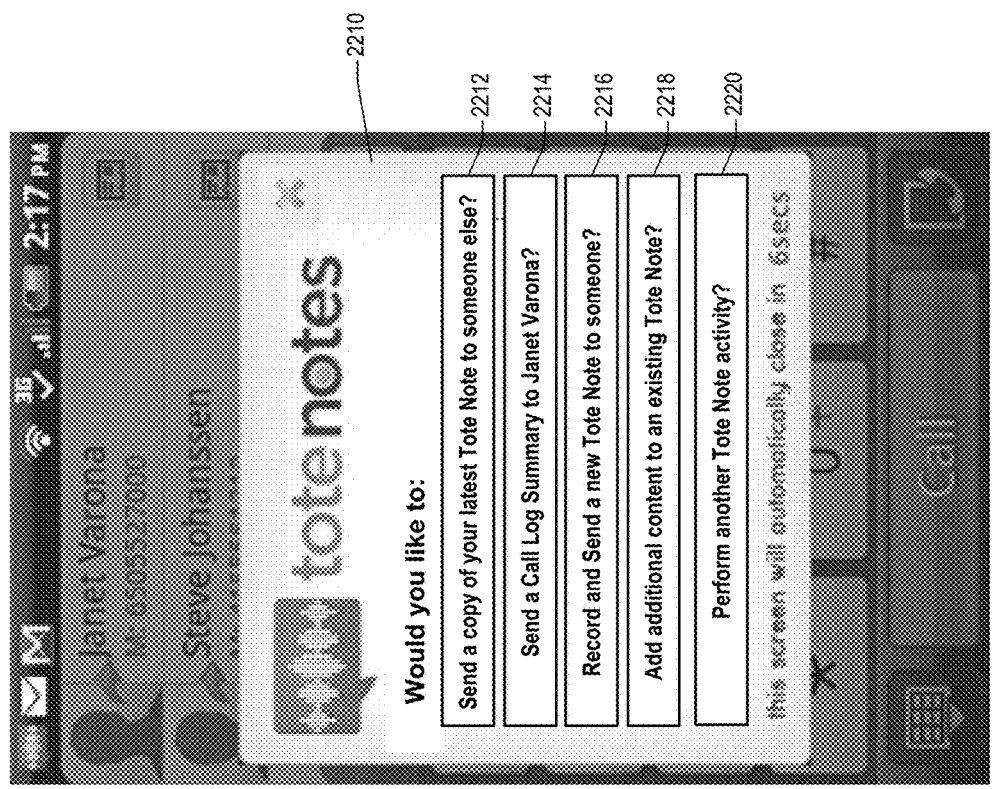

METHOD AND APPARATUS FOR ANNOTATING A CALL

RELATED APPLICATION DATA

This application is a continuation application of U.S. patent application Ser. No. 14/834,442, titled "METHOD AND APPARATUS FOR PRODUCING A PROMPT ON A MOBILE DEVICE", now U.S. Pat. No. 9,473,618, which is a continuation application of U.S. patent application Ser. No. 14/294,495, titled "AUTOMATED PROMPTING TECHNIQUES IMPLEMENTED VIA MOBILE DEVICES AND SYSTEMS", now U.S. Pat. No. 9,118,774, which is a continuation application of U.S. patent application Ser. No. 13/798,009, titled "AUTOMATED PROMPTING TECHNIQUES IMPLEMENTED VIA MOBILE DEVICES AND SYSTEMS", now U.S. Pat. No. 8,750,836, which is a continuation application of U.S. patent application Ser. No. 13/494,025, titled "AUTOMATED NOTATION TECHNIQUES IMPLEMENTED VIA MOBILE DEVICES AND/OR COMPUTER NETWORKS", now U.S. Pat. No. 8,417,233, which claims the benefits of U.S. Provisional Application Ser. No. 61/496,460, titled "AUTOMATED NOTATION TECHNIQUES IMPLEMENTED VIA MOBILE DEVICES AND/OR COMPUTER NETWORKS", filed on Jun. 13, 2011. Each of these applications is incorporated herein by reference in its entirety and for all purposes.

BACKGROUND

The present disclosure relates to automated techniques for communication devices. More particularly, the present disclosure relates to automated notation techniques implemented via mobile devices and/or computer networks.

BRIEF DESCRIPTION OF THE DRAWINGS

FIGS. 9-22 illustrate example screenshots of various GUIs which may be used for facilitating activities relating to one or more of the Automated Notation aspects disclosed herein.

DETAILED DESCRIPTION OF EXAMPLE EMBODIMENTS

Overview

Figure 1:
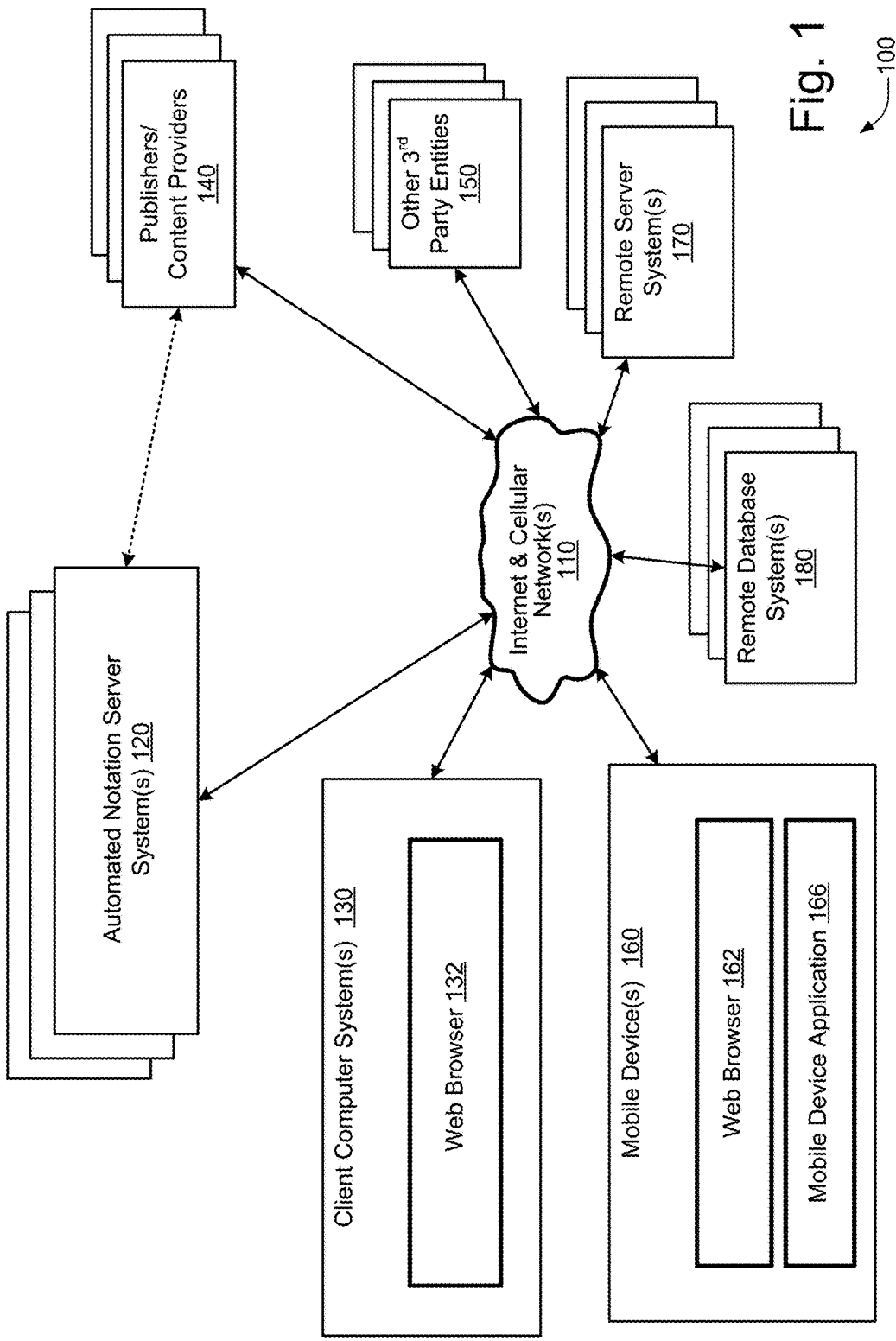
FIG. 1 illustrates a simplified block diagram of a specific example embodiment of an Automated Notation System (ANS) which may be implemented in network portion 100.

Various aspects described or referenced herein are directed to different methods, systems, and computer program products relating to automated personal assistant techniques implemented via mobile devices and/or computer networks for facilitating call event notation, tagging, calendaring, and etc.

Various aspects described or referenced herein are directed to different methods, systems, and computer program products relating to automated personal assistant techniques implemented via mobile devices and/or computer networks for facilitating call event notation, tagging, calendaring, and etc.

In at least one embodiment, various aspects are directed to different method(s), system(s) and/or computer program product(s) for operating a mobile communication device associated with a user, in which at least one processor is caused to execute a plurality of instructions for: identifying a set of threshold criteria for causing automatic display, at the mobile communication device, of a user interface prompting the user to initiate a procedure at the mobile communication device; determining if an occurrence of an end of call (EOC) event has been detected at the mobile communication device, the end of call (EOC) event relating to a termination of a phone call conducted at the mobile communication device; determining if the set of threshold criteria has been satisfied; automatically displaying the user interface at the mobile communication device if it is determined that: (i) the occurrence of the end of call (EOC) event has been detected, and (ii) the set of threshold criteria has been satisfied, wherein the displaying of the user interface includes a prompt to the user to initiate a procedure at the mobile communication device; initiating the procedure at the mobile communication device in response to receiving input from the user authorizing initiation of the procedure; wherein the initiating of the procedure includes: (i) generating, using an input from the user, a portion of digital content; (ii) accessing information which includes details relating to the phone call; (iii) creating an electronic data file which associates the portion of digital content with at least a portion of the details relating to the phone call; and; (iv) saving the electronic data file at a storage device such that the electronic data file is accessible to the user for future reference.

Additional method(s), system(s) and/or computer program product(s) may be further operable to cause at least one processor to execute additional instructions for causing the user interface to not be displayed after detection of the occurrence of the end of call (EOC) event if it is determined that the set of threshold criteria has not been satisfied. In some embodiments, the set of threshold criteria includes criteria selected from a group consisting of: time related criteria, day/date related criteria, contact information criteria, call duration criteria, call frequency criteria, and call type criteria.

In some embodiments, the set of threshold criteria includes criteria identifying a time threshold value relating to a minimum call duration of the phone call, and additional method(s), system(s) and/or computer program product(s) may be further operable to cause at least one processor to execute additional instructions for: automatically displaying a user interface at the mobile communication device if it is determined that: (i) the occurrence of the end of call (EOC)

event has been detected, and (ii) the duration of the call at the mobile communication device has met or exceeded a minimum call duration time threshold value.

In some embodiments, the set of threshold criteria includes instructions for enabling a display of a user interface in connection with at least one communication event at the mobile communication device associated with an identified contact, the identified contact having associated therewith a set of contact information, and additional method(s), system(s) and/or computer program product(s) may be further operable to cause at least one processor to execute additional instructions for: analyzing call details relating to the phone call to determine whether the phone call is associated with the identified contact; and; automatically displaying the user interface at the mobile communication device if it is determined that: (i) the occurrence of the end of call (EOC) event has been detected, and (ii) the phone call is associated with the identified contact.

In some embodiments, the set of threshold criteria includes criteria identifying a date range for enabling the display of the user interface, and additional method(s), system(s) and/or computer program product(s) may be further operable to cause at least one processor to execute additional instructions for: analyzing call details relating to the phone call to determine whether the phone call event occurred during the date range; and; automatically displaying the user interface at the mobile communication device if it is determined that: (i) the occurrence of the end of call (EOC) event has been detected, and (ii) the phone call event occurred during the date range.

In some embodiments, the set of threshold criteria includes criteria identifying a time range for enabling display of the user interface, and additional method(s), system(s) and/or computer program product(s) may be further operable to cause at least one processor to execute additional instructions for: analyzing a set of call details relating to the phone call to determine whether the phone call event occurred during the time range; and; automatically displaying the user interface at the mobile communication device if it is determined that: (i) the occurrence of the end of call (EOC) event has been detected, and (ii) the phone call event occurred during the time range.

Additional method(s), system(s) and/or computer program product(s) may be further operable to cause at least one processor to execute additional instructions for: enabling the user of the mobile communication device to define display timeout criteria representing a maximum amount of time that the user interface is to be displayed at the mobile communication device; waiting, after display of the user interface message at the mobile communication device, to receive user response input from the user in response to the displayed user interface prompt; automatically removing display of the user interface at the mobile communication device if no user response input is received after the user interface has been displayed for the maximum amount of time; and; initiating the procedure at the mobile communication device if a user response is received at the mobile communication device before the maximum amount of time has elapsed, wherein the user response represents an authorization from the user to initiate the procedure.

Additional method(s), system(s) and/or computer program product(s) may be further operable to cause at least one processor to execute additional instructions for: recording, using the mobile communication device, a portion of audio content provided by the user, wherein the portion of digital content includes the portion of recorded audio content; transcribing the portion of audio content to thereby generate a text transcription content representing the portion of audio content; and; generating an electronic communication message which includes the portion of recorded audio content, the text transcription content, and at least a portion of the details relating to the detected phone call event.

Additional objects, features and advantages of the various aspects described or referenced herein will become apparent from the following description of its preferred embodiments, which description should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Various aspects disclosed herein are directed to different types of automated personal assistant techniques for facilitating call event notation, tagging, calendaring, and etc., particularly those implemented on mobile devices. For reference purposes, such automated techniques may be referred to herein as "Automated Notation" techniques, or alternatively may be referred to herein as "Tote Note" techniques. In at least one embodiment, a "Tote Note" may represent a personalized set of content (e.g., text, audio, video, images.) relating to a user-based event (such as the end of a telephone call, for example). As described in greater detail herein, the various automated Tote Note techniques described herein may be utilized to facilitate the generation of one or more personalized Tote Notes.

In at least one embodiment, the Tote Note technique(s) provides a user of a mobile communication device with a relatively easy way to record and organize personal notes relating to one or more selected telephone conversations conducted by the user. It can also be used to manage notes, tasks, and to schedule items related to the user's contacts and social network(s). In at least one embodiment, a Tote Notes Application (TNA) running on a user's mobile device (such as, for example, an iPhone, Android-based smart phone, PDA, etc.) may be configured or designed to automatically detect an end of phone call event at the mobile device, and to automatically display a "pop-up" dialog GUI prompting the user to record a Tote Note (if desired), to be associated with the phone call which just ended.

Example Block Diagram Description

FIG. 1 illustrates a simplified block diagram of a specific example embodiment of an Automated Notation System (ANS) which may be implemented in network portion 100. As described in greater detail herein, different embodiments of personal automated note-taking system may be configured, designed, and/or operable to provide various different types of operations, functionalities, and/or features generally relating to Automated Notation System technology. Further, as described in greater detail herein, many of the various operations, functionalities, and/or features of the Automated Notation System(s) disclosed herein may provide different types of advantages and/or benefits to different entities interacting with the Automated Notation System(s).

According to different embodiments, at least some Automated Notation System(s) may be configured, designed, and/or operable to provide a number of different advantages and/or benefits and/or may be operable to initiate, and/or enable various different types of operations, functionalities, and/or features, such as, for example, one or more of the following (or combinations thereof):

The "Tote Notes" personal automated note-taking system is unique and innovative software productivity tool which enables users to record and store personal notes of their interactions with selected individuals, with an emphasis upon mobile phone calls, and allows those notes to be stored within the users email system and/or other types of communications, notes, databases and/or logs.

In at least one embodiment, at the conclusion of a mobile phone call, or by manually starting the Tote Note Application, the user is prompted to 'record' a Tote Note.

In at least one embodiment, the Tote Note Application records the user's voice and transcribes his/her words in to text. These data are packaged and attached to an email automatically generated by the ANS.

The ANS populates the email subject heading with specific information related to the call or personal interaction, including: the marketing name of the product as an identifier, the name of the person with whom the phone call or contact occurred; and the date and time of the note, which is approximately the same time as the date and time of the phone call or personal interaction. In at least one embodiment, it may also include the duration of the call.

The content of at least one email may include general notes, follow up tasks, calendar items and appointments, and more.

The user has the option of configuring his or her own email system to automatically sort and/or organize the emails by contact name.

The ANS is available as a stand-alone product or as an API module. The API module provides the same functionality as the stand-alone product, but is designed to integrate with any number of other software products, CRM systems, and proprietary record-keeping and management systems.

The ANS may be configured to automatically initiate one or more Tote Note activities in response to events/conditions which match predetermined business rules, such as, for example, during specified hours and days, such as "business hours" and etc.

The ANS may be configured to automatically initiate one or more Tote Note activities in response to identifying activities relating to one or more specified contacts.

Automatically populates subject field with specific information from the name and date of the contact.

Software understands who you spoke to and when you spoke, so it helps to easily organize and track selected phone calls.

Gives users the ability to make note of and track one or more mobile phone call interactions.

Provides an email or text message which may be searched, archived, and organized.

May be integrated with other systems, such as the users email software/client, or any number of third party databases and software tools.

Engages the user automatically at the conclusion of a mobile phone call without having to manually start.

In one embodiment, software records voice and transcribes text simultaneously.

In another embodiment, components of the ANS may relay audio data to remote server for transcription and delivery.

Automatically places voice and text-based information in to an electronic package/folder that is ready to be transmitted either separately or together to a preselected destination, such as, but not limited to, an email address, computer server, or a phone number.

Imports contact information from phone module to be used within electronic correspondence as a unique identifier.

In one embodiment, interprets voice data to perform commands, which may include, but is not limited to, setting calendar items, making phone calls, updating social media, etc.

Automatically places note information in to a correspondence medium in multiple formats, such as email or text messages or other electronic message formats.

Figure 4:
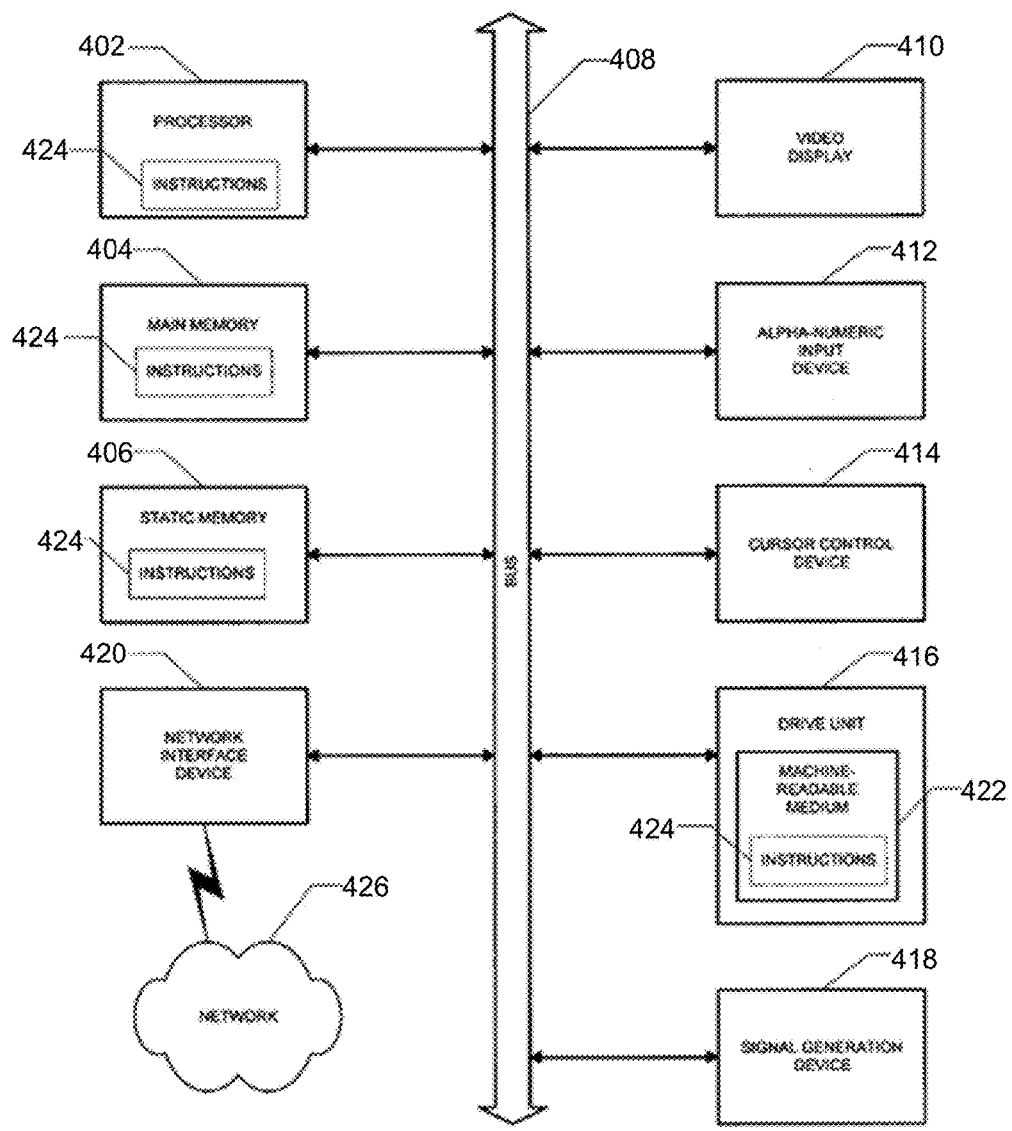
FIG. 4 shows a diagrammatic representation of machine in the exemplary form of a client (or end user) computer system 400 within which a set of instructions, for causing the machine to perform any one or more of the methodologies discussed herein, may be executed.
Figure 5:
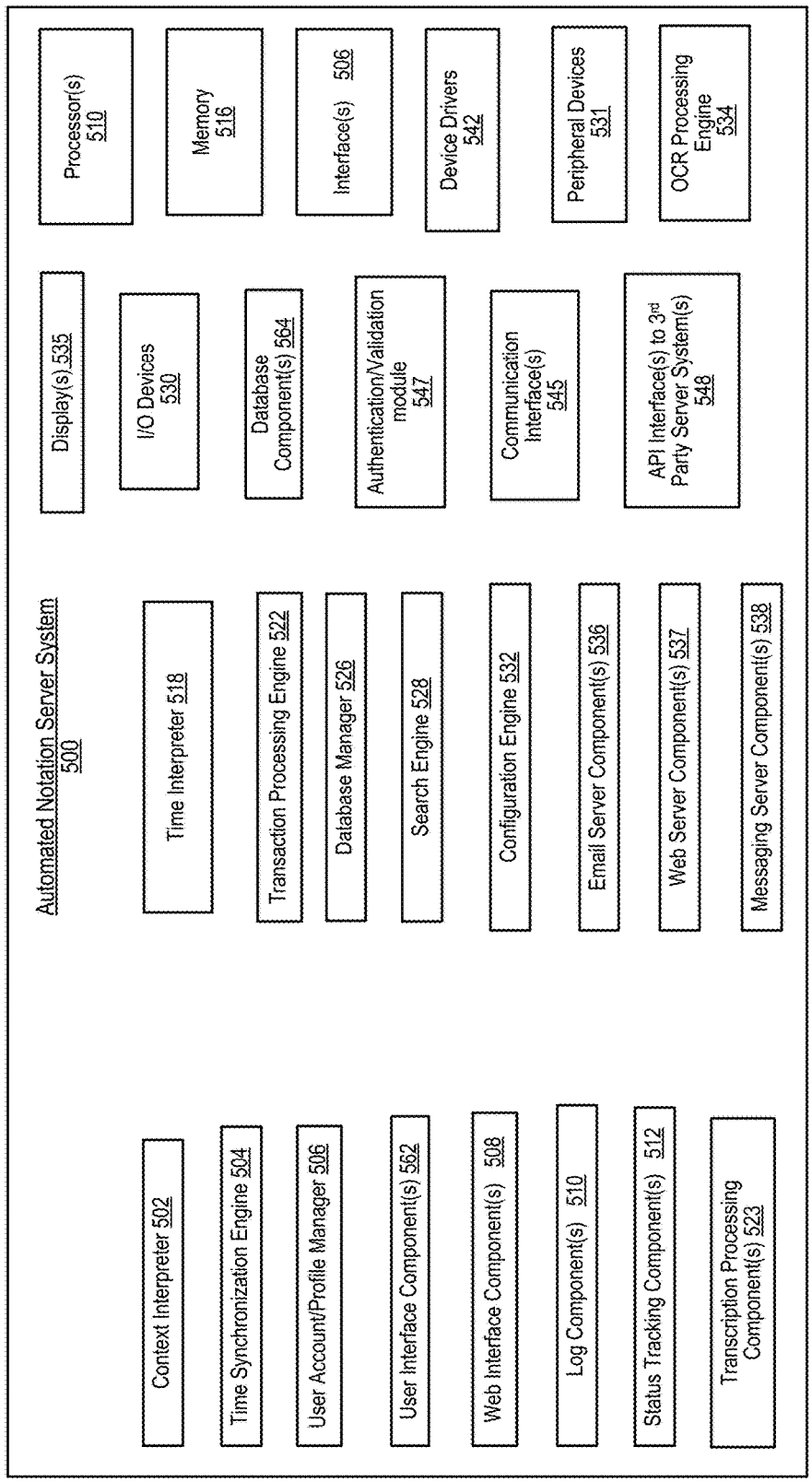
FIG. 5 illustrates an example of a functional block diagram of an Automated Notation Server System in accordance with a specific embodiment.

According to different embodiments, the Automated Notation System 100 may include a plurality of different types of components, devices, modules, processes, systems, etc., which, for example, may be implemented and/or instantiated via the use of hardware and/or combinations of hardware and software. For example, as illustrated in FIG. 1, the Automated Notation System may include one or more of the following types of systems, components, devices, processes, etc. (or combinations thereof):

Automated Notation Server System(s) 120—In at least one embodiment, the Automated Notation Server System(s) may be operable to perform and/or implement various types of functions, operations, actions, and/or other features such as those described or referenced herein (e.g., such as those illustrated and/or described with respect to FIGS. 4 and 5).

Publisher/Content Provider System component(s) 140

Client Computer System (s) 130

3$^{rd}$ Party System(s) 150

Internet & Cellular Network(s) 110

Remote Database System(s) 180

Remote Server System(s) 170

Figure 2:
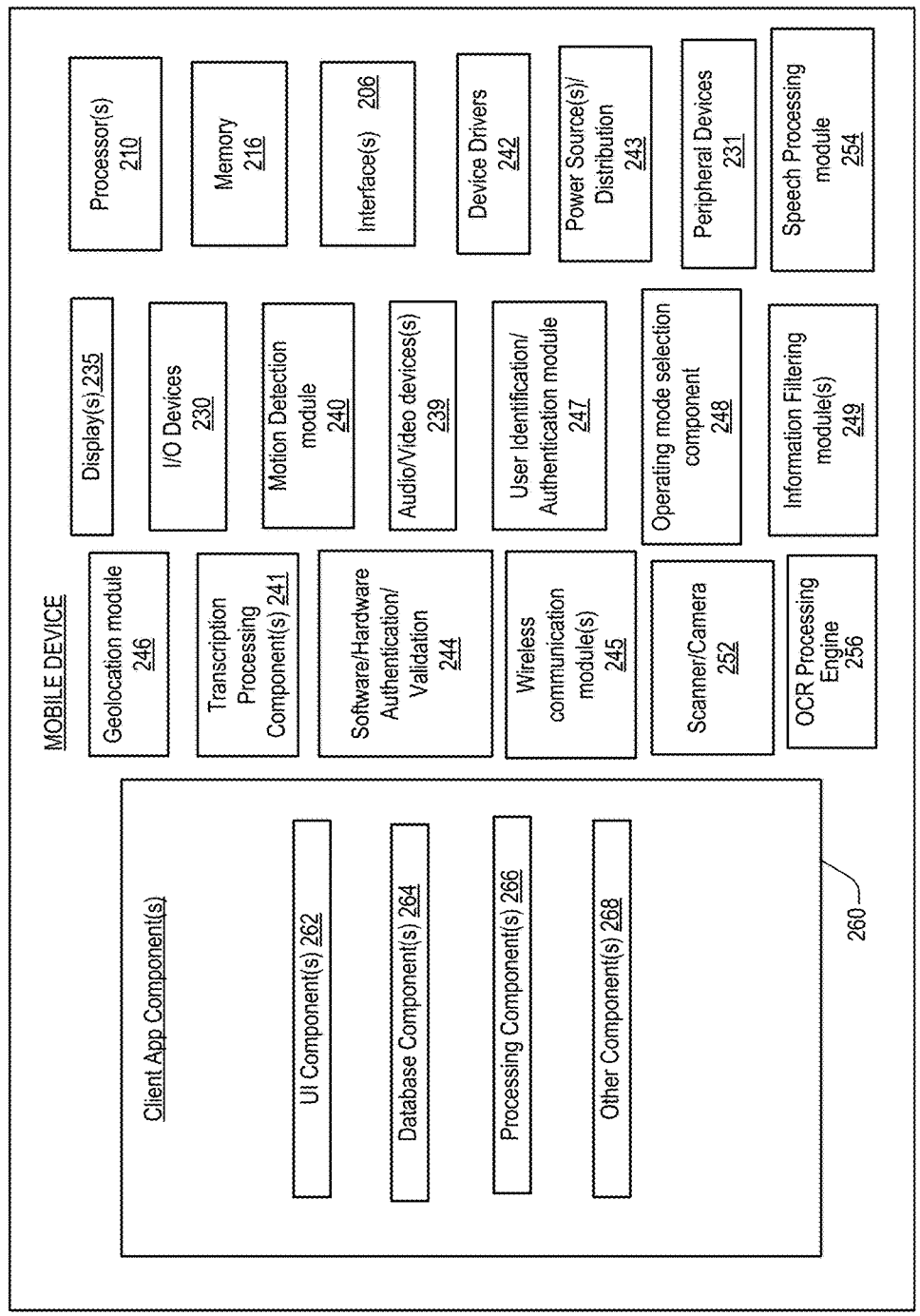
FIG. 2 is a simplified block diagram of an exemplary Mobile Device 200 in accordance with a specific embodiment.

Mobile Device(s) 160—In at least one embodiment, the Mobile Device(s) may be operable to perform and/or implement various types of functions, operations, actions, and/or other features such as those described or referenced herein (e.g., such as those illustrated and/or described with respect to FIG. 2).

etc.

In at least one embodiment, the Automated Notation System may be operable to utilize and/or generate various different types of data and/or other types of information when performing specific tasks and/or operations. This may include, for example, input data/information and/or output data/information. For example, in at least one embodiment, the Automated Notation System may be operable to access, process, and/or otherwise utilize information from one or more different types of sources, such as one or more local and/or remote memories, devices and/or systems. Additionally, in at least one embodiment, the Automated Notation System may be operable to generate one or more different types of output data/information, which, for example, may be stored in memory of one or more local and/or remote devices and/or systems. Examples of different types of input data/information and/or output data/information which may be accessed and/or utilized by the Automated Notation System may include, but are not limited to, one or more of those described and/or referenced herein.

According to specific embodiments, multiple instances or threads of the Automated Notation System may be concurrently implemented and/or initiated via the use of one or more processors and/or other combinations of hardware and/or hardware and software. For example, in at least some embodiments, various aspects, features, and/or functionalities of the Automated Notation System may be performed, implemented and/or initiated by one or more of the various systems, components, systems, devices, procedures, processes, etc., described and/or referenced herein.

In at least one embodiment, a given instance of the Automated Notation System may access and/or utilize information from one or more associated databases. In at least one embodiment, at least a portion of the database information may be accessed via communication with one or more local and/or remote memory devices. Examples of different types of data which may be accessed by the Automated Notation System may include, but are not limited to, one or more of those described and/or referenced herein.

According to different embodiments, one or more different threads or instances of the Automated Notation System may be initiated in response to detection of one or more conditions or events satisfying one or more different types of minimum threshold criteria for triggering initiation of at least one instance of the Automated Notation System. Various examples of conditions or events which may trigger initiation and/or implementation of one or more different threads or instances of the Automated Notation System may include, but are not limited to, one or more of those described and/or referenced herein.

It may be appreciated that the Automated Notation System of FIG. 1 is but one example from a wide range of Automated Notation System embodiments which may be implemented. Other embodiments of the Automated Notation System (not shown) may include additional, fewer and/or different components/features that those illustrated in the example Automated Notation System embodiment of FIG. 1.

Example Use Case Scenarios

The following examples are intended to help illustrate some of the various types of functions, operations, actions, and/or other features which may be provided by the Automated Notation System. For purposes of illustration, at least some of the examples are described herein by way of reference to FIGS. 9-17 of the drawings.

FIGS. 9-17 illustrate respective example screenshots of various GUIs which may be used for facilitating activities relating to one or more of the Automated Notation aspects disclosed herein. In at least one embodiment, at least a portion of the GUIs may be configured or designed for use at one or more mobile devices.

Figure 9:
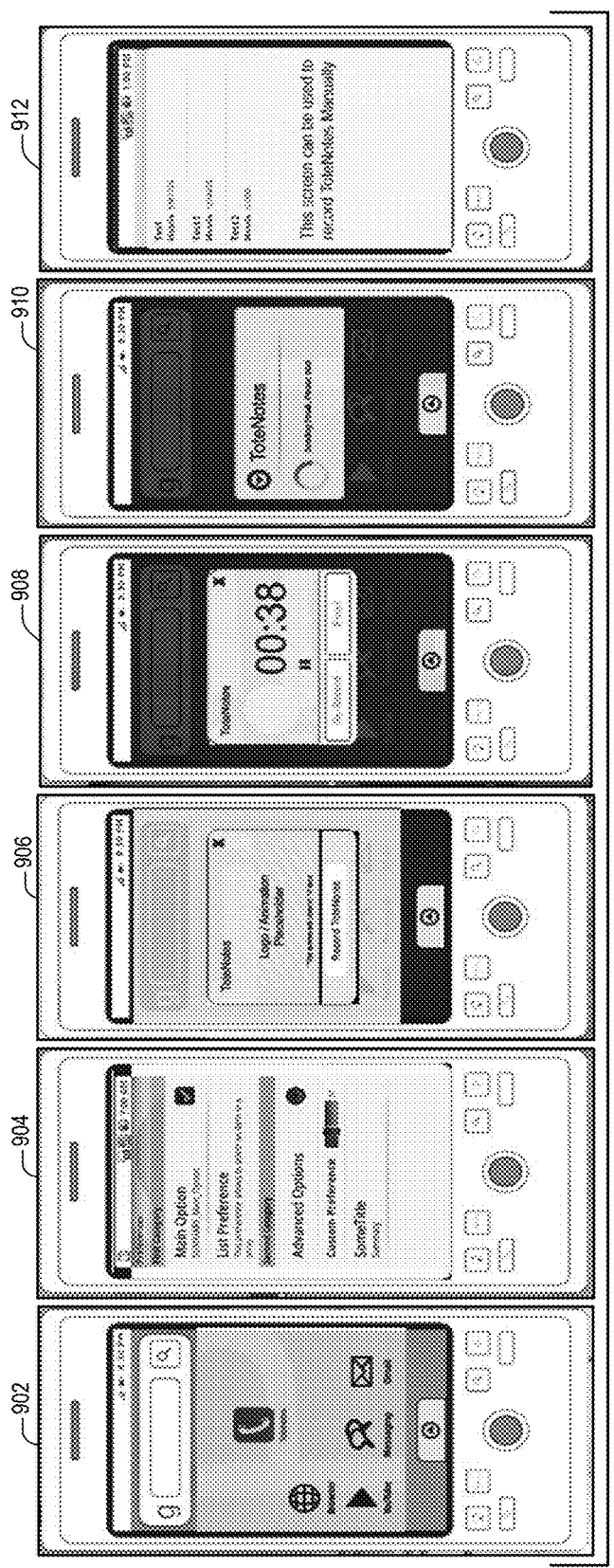

FIG. 9 shows an example sequence of GUIs (e.g., screenshots) which may be displayed to a user in connection with one or more of the features, operations and/or techniques of the Automated Notation System and/or Tote Note Application.

As illustrated in the example embodiment of FIG. 9, the Automated Notation GUI 900 may be operable to facilitate, initiate and/or perform one or more of the following operation(s)/action(s) (or combinations thereof):

GUI 902 illustrates an example of a typical "home screen" for a mobile device, where the client application has been installed and is running, and is displayed as an icon in one or more of several locations.

GUI 904 shows an example screenshot GUI which may be displayed at the user's mobile device to help facilitate Tote Note Application setup and configuration options. Configuration options are modified by the user, and based upon user preferences, which, for example, may include, but are not limited to: hours of operation, output options, pre-selection of user lists for triggering, timing/duration features of the client application, destination of output data, calendar settings, and more.

GUI 906 shows an example screenshot GUI which may be displayed at the user's mobile device to help facilitate user engagement mode activities, such as, for example, where triggering options have been satisfied and the Tote Note Application is activated at the user's mobile device and is seeking the user's commands/instructions.

GUI 908 shows an example screenshot GUI which may be displayed at the user's mobile device to help facilitate Tote Note recording mode activities, such as, for example, where triggering events and user commands have activated client application to (in one embodiment) record and/or transcribe and/or interpret user's spoken word(s).

GUI 910 shows an example screenshot GUI which may be displayed at the user's mobile device to help facilitate "send" mode activities, such as, for example, where input data is being compiled and output data is being generated as (in one embodiment) a text message or email message or other form of electronic correspondence.

GUI 912 shows an example screenshot GUI which may be displayed at the user's mobile device to help facilitate manual activation mode activities, such as, for example, where the user manually activates software by (in one embodiment) selecting from the contact database or phone log/history.

Example User Scenario for Mobile Device

For purposes of illustration, a example scenario is described below in which a user operates the Tote Note Application at the users mobile device based upon facts/assumptions provided in the example.

User installs application upon mobile device.
User configures the Tote Note Application settings and options (see, e.g., example GUIs of FIGS. 13-19)
User places a call at 2:25 PM on Thursday, and stays on the call for approximately 5 minutes.
At the conclusion of the call, user is automatically prompted by the Tote Note Application, inquiring, "Would you like to record a Tote Note for this call?" (e.g., FIG. 10)
User selects "Yes".
A Tote Note Recording GUI is displayed (e.g., FIG. 11) which includes a timer, indicating that the mobile device is recording personal notes related to the preceding phone call.
User taps the "send" button. (e.g., FIG. 11)
Tote Note Application acquires metadata and other information relating to the identified call event, and transmits (e.g., FIG. 12) at least a portion of the Tote Note data to the Automated Notation Server System and/or other remote system(s). In at least one embodiment, the recorded audio portion of the Tote Note may be automatically sent to a transcription server for transcription of the audio content into text.
Mobile device is returned to its normal state.
Use receives an email in pre-determined email inbox, which contains audio recording of the personal note and transcribed text of the personal note. (e.g., FIG. 6)

Example User Scenario for Mobile Device with Server System

For purposes of illustration, a second example scenario is described below in which a user operates the Tote Note Application at the users mobile device based upon facts/assumptions provided in the example.

User installs Tote Note Application at mobile device.
User configures the Tote Note Application settings to automatically prompt for activation at the conclusion of phone calls from a pre-selected contact named "David Flynn". (e.g., via example GUI of FIG. 21)
David Flynn calls user at 2:25 PM on Thursday, and stays on the call for approximately 7 minutes.
At the conclusion of the call, user is prompted by application, inquiring, "Would you like to record a Tote Note for this call?" (e.g., FIG. 10)
User selects "Add Calendar Event" (1006).
User speaks verbal commands in to device regarding an upcoming calendar item. For example, "Set Appointment for lunch with David Flynn next Tuesday 12:30 PM at the sandwich shop." (e.g., FIG. 11)
Audio data is recorded by device and automatically transmitted/streamed to the Automated Notation Server System and/or other remote server system.
Automated Notation Server System automatically interprets the audio recording and associated metadata, generates Tote Note, and automatically creates a calendar appointment in the user's calendar per instructed time, using contact name and other data received from the call record. In at least one embodiment, the Automated Notation Server System may also be configured or designed to automatically and/or dynamically identify one or more contacts relating to a Tote Note created calendar event, and may automatically send calendar invites and/or other communications to the identified contacts.
In at least one embodiment, the Automated Notation Server System may automatically and periodically "POLL" mobile device to dynamically determine whether there are any current or outstanding Tote Note related activities to be performed. To see if there are any embedded, and/or after voicemail sends a text to the other person, or calendaring, and invites.

FIG. 2 is a simplified block diagram of an exemplary Mobile Device 200 in accordance with a specific embodiment. In at least one embodiment, the Mobile Device may include Tote Note Application component(s) which have been configured or designed to provide functionality for enabling or implementing at least a portion of the various Automated Notation System techniques at the Mobile Device. In at least one embodiment, the Mobile Device 200 may be operable to perform and/or implement various types of functions, operations, actions, and/or other features such as, for example, one or more of those described and/or referenced herein.

According to specific embodiments, various aspects, features, and/or functionalities of the Mobile Device may be performed, implemented and/or initiated by one or more of the following types of systems, components, systems, devices, procedures, processes, etc. (or combinations thereof):

- Processor(s) 210
- Device Drivers 242
- Memory 216
- Interface(s) 206
- Power Source(s)/Distribution 243
- Geolocation module 246
- Display(s) 235
- I/O Devices 230
- Audio/Video devices(s) 239
- Peripheral Devices 231
- Motion Detection module 240
- User Identification/Authentication module 247
- Client App Component(s) 260
- Other Component(s) 268
- UI Component(s) 262
- Database Component(s) 264
- Processing Component(s) 266
- Software/Hardware Authentication/Validation 244
- Wireless communication module(s) 245
- Information Filtering module(s) 249
- Operating mode selection component 248
- Speech Processing module 254
- Scanner/Camera 252
- OCR Processing Engine 256
- etc.

As illustrated in the example of FIG. 2 Mobile Device 200 may be implemented as a mobile or handheld computing device which includes a variety of components, modules and/or systems for providing various functionality. For example, as illustrated in FIG. 2, Mobile Device 200 may include Tote Note Application components (e.g., 260), which, for example, may include, but are not limited to, one or more of the following (or combinations thereof):

- UI Components 262 such as those illustrated, described, and/or referenced herein.
- Database Components 264 such as those illustrated, described, and/or referenced herein.
- Processing Components 266 such as those illustrated, described, and/or referenced herein.
- Other Components 268 which, for example, may include components for facilitating and/or enabling the Mobile Device to perform and/or initiate various types of operations, activities, functions such as those described herein.

In at least one embodiment, the Tote Note Application component(s) may be operable to perform and/or implement various types of functions, operations, actions, and/or other features such as, for example, one or more of the following (or combinations thereof):

- The Tote Note Application may be installed and operated at a user's mobile communication device such as a mobile telephone/smart phone device.
- The Tote Note Application presents configuration options, which may include, but are not limited to, hours of operation, pre-selected contact names for the use with the system, options related to time constraints associated with the application's functions and/or features, rules for selecting individual contact records, amongst other options.
- The Tote Note Application may operate continually in the background during user-specified times of operation.
- Tote Note Application automatically activates at the conclusion or end of a phone call and/or other triggering event(s).
- In one embodiment, Tote Note Application provides interface to collect audio recording of voice notes and transcription of notes to text.
- In one embodiment, the Tote Note Application records audio and sends audio data, contact data, call data, call duration, time/date data, and other data to a remote server for transcription.
- In one embodiment, the Tote Note Application transcribes audio dictation to text locally at the mobile device.
- The Tote Note Application may assemble input data, including but not limited to voice audio data, transcribed text data in to multiple formats, locational data, GPS data, time and date data, calendar information, call data such as call duration, video and graphic information
- The Tote Note Application may automatically and/or dynamically generate an outgoing message which may include several types of date, metadata, and/or other information such as, for example, one or more of the following (or combinations thereof):
  - contact information (e.g., relating to person(s) which the user may have spoken to);
  - the date and time of the correspondence or call;
  - the duration of the call;
  - locational/GPS data;
  - voice/audio/transcribed input data (e.g., provided by the user);
  - etc.
- In one embodiment information may be conveyed in a variety of different electronic mediums and networks, which may include the internet, wireless networks, and private/proprietary electronic networks
- The Tote Note Application may automatically and/or dynamically generate Tote Notes in email format, text message format, calendar event format, and/or other types of formats.
- In one embodiment, the Tote Note Application interprets the spoken and/or transcribed works, instructing and initiating other electronic processes, which may include but is not limited to making a phone call, sending an email, setting a calendar appointment, etc.
- The Tote Note Application may be configured or designed to facilitate access to various types of communication networks such as, for example, one or more of the following (or combinations thereof): the internet, wireless networks, a private electronic networks, or proprietary electronic communication systems, cellular networks, local area networks, etc.
- In one embodiment, the Tote Note Application may automatically access various types of information at the user's mobile communication device such as, for example, one or more of the following (or combinations thereof): contacts, call log history data, GPS data, user profile data, etc.
- In at least one embodiment, the Tote Note Application may be operable to access, send, receive, store, retrieve, and/or acquire various types of data which may be used at the user's mobile device and/or by other components/systems of the Automated Notation System.

In at least one embodiment, the Tote Note Application may automatically and/or dynamically acquire and/or present contextually relevant advertising information at the user's mobile device.

In at least one embodiment, the Tote Note Application may communicate with the Automated Notation Server System to automatically perform, initiate, manage, track, store, analyze, and/or retrieve various types of data and/or other information (such as, for example, call log data, contact data, email messages, text messages, and other electronic correspondence) which may be generated by (and/or used by) the Tote Note Application and/or Automated Notation System.

According to specific embodiments, multiple instances or threads of the Tote Note Application component(s) may be concurrently implemented and/or initiated via the use of one or more processors and/or other combinations of hardware and/or hardware and software. For example, in at least some embodiments, various aspects, features, and/or functionalities of the Tote Note Application component(s) may be performed, implemented and/or initiated by one or more of the following types of systems, components, systems, devices, procedures, processes, etc., described and/or referenced herein.

According to different embodiments, one or more different threads or instances of the Tote Note Application component(s) may be initiated in response to detection of one or more conditions or events satisfying one or more different types of minimum threshold criteria for triggering initiation of at least one instance of the Tote Note Application component(s). Various examples of conditions or events which may trigger initiation and/or implementation of one or more different threads or instances of the Tote Note Application component(s) may include, but are not limited to, one or more of the following (or combinations thereof):

In one embodiment, one or more functions of the Tote Note Application may be automatically triggered by the termination of a phone call, whether intentionally ended by the user, or intentionally ended by the other party on the telephone call, or inadvertently through a poor signal (e.g. "dropped call) etc., and that phone call is of a duration that is at least XX seconds. (e.g., where XX may be a value defined either within software or by user-defined setting, such as, for example, XX=5 seconds, XX selected from a range of 1-300 seconds, etc.)

In one embodiment, one or more functions of the Tote Note Application may be automatically activated or initiated at conclusion of such phone calls during specified hours of the day and week, as configured through the options and set up of the application.

In another embodiment, one or more functions of the Tote Note Application may be automatically activated or initiated at conclusion of phone calls with specific contacts pre-selected from the mobile device's contact database. In at least one embodiment, the selection of the desired contacts may be configured through the options and set up menus of the Tote Note Application.

In another embodiment, one or more functions of the Tote Note Application may be automatically activated or initiated manually through a user interface, which may allow users to select from a list of contacts stored on the mobile device.

In another embodiment, one or more functions of the Tote Note Application may be automatically activated or initiated manually through a user interface, which may allow users to select from a list of contacts stored on the internet, or from a list of contacts upon a remote server accessed through the internet, or wireless network, or another private electronic network.

In another embodiment, one or more functions of the Tote Note Application may be automatically activated or initiated upon receipt of a voicemail or electronic message or communication from another party.

In another embodiment, one or more functions of the Tote Note Application may be automatically activated or initiated at specified triggering events and/or conditions, as determined by the user.

In another embodiment, one or more functions of the Tote Note Application may be automatically activated or initiated at the conclusion of specified calendar events.

In another embodiment, one or more functions of the Tote Note Application may be automatically activated or initiated by spoken voice command.

In at least one embodiment, a given instance of the Tote Note Application component(s) may access and/or utilize information from one or more associated databases. In at least one embodiment, at least a portion of the database information may be accessed via communication with one or more local and/or remote memory devices. Examples of different types of data which may be accessed by the Tote Note Application component(s) may include, but are not limited to, one or more of those described and/or referenced herein.

Input data may be automatically obtained by the Tote Note Application, including but not limited to voice audio data, transcribed text data, GPS/locational data, time and date data, calendar information, video and graphic information, call log data.

Input data related to contacts may be automatically obtained by the Tote Note Application, which may include details including but not limited to name, organization, telephone number, email address, www address, mailing address, physical address, and contact history.

Input data may be automatically obtained by the Tote Note Application from a remote server or database, including but not limited to voice audio data, transcribed text data, GPS/locational data, time and date data, calendar information, video and graphic information Input data related to contacts may be automatically obtained by the Tote Note Application from a remote server or database, which may include details including but not limited to name, organization, telephone number, email address, www address, mailing address, physical address, and contact history.

Input data may also include content from third party publishers, such as, for example, advertising information, alerts, communications, contact data, phone log data, billing information, etc.

According to different embodiments, Mobile Device 200 may further include, but is not limited to, one or more of the following types of components, modules and/or systems (or combinations thereof):

At least one processor 210. In at least one embodiment, the processor(s) 210 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the Mobile Device. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 216, which, for example, may include volatile memory (e.g., RAM), non-volatile memory (e.g., disk memory, FLASH memory, EPROMs, etc.), unalterable memory, and/or other types of memory. In at least one implementation, the memory 216 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the Mobile Device and/or other information relating to the functionality of the various Automated Notation techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the Automated Notation techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 206 which, for example, may include wired interfaces and/or wireless interfaces. In at least one implementation, the interface(s) 206 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (Wi-Max), 802.22, Cellular standards such as CDMA, CDMA2000, WCDMA, Radio Frequency (e.g., RFID), Infrared, Near Field Magnetics, etc.

Device driver(s) 242. In at least one implementation, the device driver(s) 242 may include functionality similar to at least a portion of functionality implemented by one or more computer system driver devices such as those described herein and/or generally known to one having ordinary skill in the art.

At least one power source (and/or power distribution source) 243. In at least one implementation, the power source may include at least one mobile power source (e.g., battery) for allowing the Mobile Device to operate in a wireless and/or mobile environment. For example, in one implementation, the power source 243 may be implemented using a rechargeable, thin-film type battery. Further, in embodiments where it is desirable for the device to be flexible, the power source 243 may be designed to be flexible.

Geolocation module 246 which, for example, may be configured or designed to acquire geolocation information from remote sources and use the acquired geolocation information to determine information relating to a relative and/or absolute position of the Mobile Device.

Motion detection component 240 for detecting motion or movement of the Mobile Device and/or for detecting motion, movement, gestures and/or other input data from user. In at least one embodiment, the motion detection component 240 may include one or more motion detection sensors such as, for example, MEMS (Micro Electro Mechanical System) accelerometers, that may detect the acceleration and/or other movements of the Mobile Device as it is moved by a user.

User Identification/Authentication module 247. In one implementation, the User Identification module may be adapted to determine and/or authenticate the identity of the current user or owner of the Mobile Device. For example, in one embodiment, the current user may be required to perform a log in process at the Mobile Device in order to access one or more features. Alternatively, the Mobile Device may be adapted to automatically determine the identity of the current user based upon one or more external signals such as, for example, an RFID tag or badge worn by the current user which provides a wireless signal to the Mobile Device for determining the identity of the current user. In at least one implementation, various security features may be incorporated into the Mobile Device to prevent unauthorized users from accessing confidential or sensitive information.

One or more display(s) 235. According to various embodiments, such display(s) may be implemented using, for example, LCD display technology, OLED display technology, and/or other types of conventional display technology. In at least one implementation, display(s) 235 may be adapted to be flexible or bendable. Additionally, in at least one embodiment the information displayed on display(s) 235 may utilize e-ink technology (such as that available from E Ink Corporation, Cambridge, Mass., www.eink.com), or other suitable technology for reducing the power consumption of information displayed on the display(s) 235.

One or more user I/O Device(s) 230 such as, for example, keys, buttons, scroll wheels, cursors, touchscreen sensors, audio command interfaces, magnetic strip reader, optical scanner, etc.

Audio/Video device(s) 239 such as, for example, components for displaying audio/visual media which, for example, may include cameras, speakers, microphones, media presentation components, wireless transmitter/receiver devices for enabling wireless audio and/or visual communication between the Mobile Device 200 and remote devices (e.g., radios, telephones, computer systems, etc.). For example, in one implementation, the audio system may include componentry for enabling the Mobile Device to function as a cell phone or two-way radio device.

Other types of peripheral devices 231 which may be useful to the users of various Mobile Devices, such as, for example: PDA functionality; memory card reader(s); fingerprint reader(s); image projection device(s); social networking peripheral component(s); etc.

Information filtering module(s) 249 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 249 may also be adapted to display, in real-time, filtered information to the user based upon a variety of criteria such as, for example, geolocation information, casino data information, player tracking information, etc.

Wireless communication module(s) 245. In one implementation, the wireless communication module 245 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 244 which, for example, may be used for authenticating and/or validating local hardware and/or software components, hardware/software components residing at a remote device, game play information, wager information, user information and/or identity, etc.

Operating mode selection component 248 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 252) which may be configured or designed for use in capturing images, recording video, scanning documents, barcodes, etc.

OCR Processing Engine (e.g., 256) which, for example, may be operable to perform image processing and optical character recognition of images such as those captured by a mobile device camera, for example.

Transcription Processing Component(s) (e.g., 241) which, for example, may be operable to automatically and/or dynamically initiate, perform, and/or facilitate transcription of audio content into corresponding text-based content. In at least one embodiment, the Transcription Processing Component(s) may utilize the services of one or more remote transcription servers for performing at least a portion of the transcription processing. In at least one embodiment, the Automated Notation Server System may initiate transcription of the Tote Note audio content via use of an API to the Google Voice transcription service (provided by Google, Inc.). In some embodiments, at least a portion of the transcription may be performed at the user's mobile communication device.

Speech Processing module (e.g., 254) which, for example, may be operable to perform speech recognition, and may be operable to perform speech-to-text conversion.

Etc.

Figure 3:
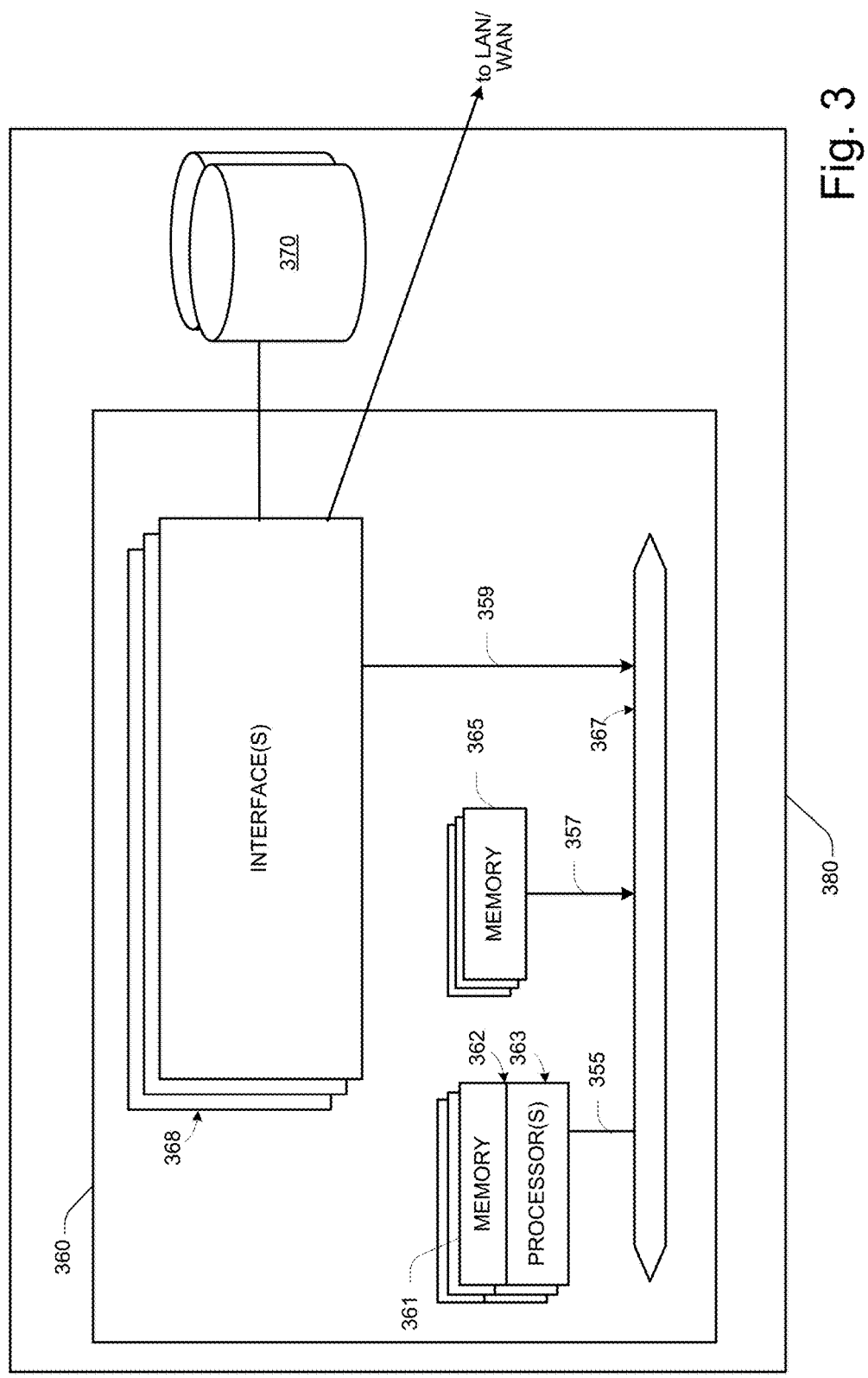
FIG. 3 illustrates an example embodiment of a server system 380 which may be used for implementing various aspects/features described herein.

FIG. 3 illustrates an example embodiment of a server system 380 which may be used for implementing various aspects/features described herein. In at least one embodiment, the server system 380 includes at least one network device 360, and at least one storage device 370 (such as, for example, a direct attached storage device). In one embodiment, server system 380 may be suitable for implementing at least some of the Automated Notation techniques described herein.

In according to one embodiment, network device 360 may include a master central processing unit (CPU) 362, interfaces 368, and a bus 367 (e.g., a PCI bus). When acting under the control of appropriate software or firmware, the CPU 362 may be responsible for implementing specific functions associated with the functions of a desired network device. For example, when configured as a server, the CPU 362 may be responsible for analyzing packets; encapsulating packets; forwarding packets to appropriate network devices; instantiating various types of virtual machines, virtual interfaces, virtual storage volumes, virtual appliances; etc. The CPU 362 preferably accomplishes at least a portion of these functions under the control of software including an operating system (e.g. Linux), and any appropriate system software (such as, for example, AppLogic™ software).

CPU 362 may include one or more processors 363 such as, for example, one or more processors from the AMD, Motorola, Intel and/or MIPS families of microprocessors. In an alternative embodiment, processor 363 may be specially designed hardware for controlling the operations of server system 380. In a specific embodiment, a memory 361 (such as non-volatile RAM and/or ROM) also forms part of CPU 362. However, there may be many different ways in which memory could be coupled to the system. Memory block 361 may be used for a variety of purposes such as, for example, caching and/or storing data, programming instructions, etc.

The interfaces 68 may be typically provided as interface cards (sometimes referred to as "line cards"). Alternatively, one or more of the interfaces 68 may be provided as on-board interface controllers built into the system motherboard. Generally, they control the sending and receiving of data packets over the network and sometimes support other peripherals used with the server system 80. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™) 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 362 to efficiently perform routing computations, network diagnostics, security functions, etc.

In at least one embodiment, some interfaces may be configured or designed to allow the server system 380 to communicate with other network devices associated with various local area network (LANs) and/or wide area networks (WANs). Other interfaces may be configured or designed to allow network device 360 to communicate with one or more direct attached storage device(s) 370.

Although the system shown in FIG. 3 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 365, which, for example, may include random access memory (RAM)) configured to store data, program instructions for the general-purpose network operations and/or other information relating to the functionality of the various Automated Notation techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 4 shows a diagrammatic representation of machine in the exemplary form of a client (or end user) computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU) or both), a main memory 404 and a static memory 406, which communicate with at least one other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The Tote Note Application 424 may also reside, completely or at least partially, within the main memory 404 and/or within the processor 402 during execution thereof by the computer system 400, the main memory 404 and the processor 402 also constituting machine-readable media.

The Tote Note Application 424 may further be transmitted or received over a network 426 via the network interface device 420 utilizing any one of a number of well-known transfer protocols (e.g., HTTP).

While the machine-readable medium 422 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 400 may include a variety of components, modules and/or systems for providing various types of functionality.

For example, in at least one embodiment, Client Computer System 400 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

- User Interface (UI) Components such as those illustrated, described, and/or referenced herein.
- Database Components such as those illustrated, described, and/or referenced herein.
- Processing Components such as those illustrated, described, and/or referenced herein.
- Other Components which, for example, may include components for facilitating and/or enabling the Client Computer System to perform and/or initiate various types of operations, activities, functions such as those described herein.

FIG. 5 illustrates an example of a functional block diagram of an Automated Notation Server System in accordance with a specific embodiment. In at least one embodiment, the Automated Notation Server System may be operable to perform and/or implement various types of functions, operations, actions, and/or other features such as, for example, one or more of the following (or combinations thereof):

- In one embodiment, the Server System functions may establish user profiles to store and maintain user accounts, user data, and user settings, and output data.
- In another embodiment server system data may be obtained by the mobile device or mobile device application, which may include but is not limited to contact name, organization, telephone number, email address, www address, mailing address, physical address, contact history, voice audio data, transcribed text data, GPS/locational data, time and date data, calendar information, call log data, duration of call data, video and graphic information
- In another embodiment, the server system may remotely process input data and command data and interpreted data, and assemble or individual or combined data into an output format, which may be delivered in a variety of electronic formats. For example, the Server System may process audio input data through a transcription software module or service, producing output data in the form of transcribed text, which is sent back to the mobile device, or is forwarded directly to a user-specified location.

In at least one embodiment, the Automated Notation Server System may include a plurality of components operable to perform and/or implement various types of functions, operations, actions, and/or other features such as, for example, one or more of the following (or combinations thereof):

- Context Interpreter (e.g., 502) which, for example, may be operable to automatically and/or dynamically analyze contextual criteria relating to a given event and concurrent conditions, and automatically determine or identify the most likely actions and/or responses to be performed. According to different embodiments, examples of contextual criteria which may be analyzed may include, but are not limited to, one or more of the following (or combinations thereof):
  - location-based criteria (e.g., geolocation of client device, geolocation of agent device, etc.)
  - time-based criteria
  - identity of Client user
  - identity of Agent user
  - user profile information
  - transaction history information
  - recent user activities
  - proximate business-related criteria (e.g., criteria which may be used to determine whether the client device is currently located at or near a recognized business establishment such as a bank, gas station, restaurant, supermarket, etc.)
  - etc.

For example, in at least one embodiment, the Automated Notation Server System could determine that if a customer is using a mobile Automated Notation client device at the airport (Location obtained via GPS), the customer is planning to check in or identify himself with an airport agent.
- Time Synchronization Engine (e.g., 504) which, for example, may be operable to manages universal time synchronization (e.g., via NTP and/or GPS)
- Search Engine (e.g., 528) which, for example, may be operable to search for transactions, logs, items, accounts, options in the TIS databases
- Configuration Engine (e.g., 532) which, for example, may be operable to determine and configure activation and expiration settings for one or more TIDs. In at least one embodiment, the Configuration Engine may also be operable to manage various types of TIS database information such as, for example, user credit card/payment accounts, device associations, user identification information, payment gateway information, etc.
- Transcription Processing Component(s) (e.g., 523) which, for example, may be operable to automatically and/or dynamically initiate, perform, and/or facilitate transcription of audio content into corresponding text-based content. In at least one embodiment, the Transcription Processing Component(s) may utilize the services of one or more remote transcription servers for performing at least a portion of the transcription processing. In at least one embodiment, the Automated Notation Server System may initiate transcription of the Tote Note audio content via use of an API to the Google Voice transcription service (provided by Google, Inc.).
- Time Interpreter (e.g., 518) which, for example, may be operable to automatically and/or dynamically modify or change security identifier activation and expiration time(s) based on various criteria such as, for example, time, location, transaction status, etc.
- Authentication/Validation Component(s) (e.g., 547) (password, software/hardware info, security identifier, SSL certificates) which, for example, may be operable to perform various types of authentication/validation tasks such as, for example, one or more of the following (or combinations thereof):
  - verifying/authenticating devices,
  - verifying passwords, passcodes, SSL certificates, biometric identification information, and/or other types of security-related information
  - verify/validate security identifier activation and/or expiration times
  - etc.

In one implementation, the Authentication/Validation Component(s) may be adapted to determine and/or authenticate the identity of the current user or owner of the mobile client system. For example, in one embodiment, the current user may be required to perform a log in process at the mobile client system in order to access one or more features. In some embodiments, the mobile client system may include biometric security components which may be operable to validate and/or authenticate the identity of a user by reading or scanning The users biometric information (e.g., fingerprints, face, voice, eye/iris, etc.). In at least one implementation, various security features may be incorporated into the mobile client system to prevent unauthorized users from accessing confidential or sensitive information.

- Transaction Processing Engine (e.g., 522) which, for example, may be operable to handle various types of transaction processing tasks such as, for example, one or more of the following (or combinations thereof): identifying/determining transaction type; determining which payment gateway(s) to use; associating databases information to security identifiers; etc.
- OCR Processing Engine (e.g., 534) which, for example, may be operable to perform image processing and optical character recognition of images such as those captured by a mobile device camera, for example.
- Database Manager (e.g., 526) which, for example, may be operable to handle various types of tasks relating to database updating, database management, database access, etc. In at least one embodiment, the Database Manager may be operable to manage TISS databases, Automated Notation Device Application databases, Transaction ID Appliance databases, etc.
- Log Component(s) (e.g., 510) which, for example, may be operable to generate and manage transactions history logs, system errors, connections from APIs, etc.
- Status Tracking Component(s) (e.g., 512) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.
- Gateway Component(s) (e.g., 514) which, for example, may be operable to facilitate and manage communications and transactions with external Payment Gateways.
- Web Interface Component(s) (e.g., 508) which, for example, may be operable to facilitate and manage communications and transactions with TIS web portal(s).
- API Interface(s) to Automated Notation Server System(s) (e.g., 546) which, for example, may be operable to facilitate and manage communications and transactions with API Interface(s) to Automated Notation Server System(s)
- API Interface(s) to 3rd Party Server System(s) (e.g., 548) which, for example, may be operable to facilitate and manage communications and transactions with API Interface(s) to 3rd Party Server System(s)
- OCR Processing Engine (e.g., 534) which, for example, may be operable to perform image processing and optical character recognition of images such as those captured by a mobile device camera, for example.
- At least one processor 510. In at least one embodiment, the processor(s) 510 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.
- Memory 516, which, for example, may include volatile memory (e.g., RAM), non-volatile memory (e.g., disk memory, FLASH memory, EPROMs, etc.), unalterable memory, and/or other types of memory. In at least one implementation, the memory 516 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, Transaction ID information/images, and/or information/data relating to other features/functions described herein. Because such information and program instructions may be employed to implement at least a portion of the Automated Notation System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.
- Interface(s) 506 which, for example, may include wired interfaces and/or wireless interfaces. In at least one implementation, the interface(s) 506 may include functionality similar to at least a portion of functionality implemented by one or more computer system interfaces such as those described herein and/or generally known to one having ordinary skill in the art.
- Device driver(s) 542. In at least one implementation, the device driver(s) 542 may include functionality similar to at least a portion of functionality implemented by one or more computer system driver devices such as those described herein and/or generally known to one having ordinary skill in the art.

One or more display(s) 535. According to various embodiments, such display(s) may be implemented using, for example, LCD display technology, OLED display technology, and/or other types of conventional display technology. In at least one implementation, display(s) 535 may be adapted to be flexible or bendable. Additionally, in at least one embodiment the information displayed on display(s) 535 may utilize e-ink technology (such as that available from E Ink Corporation, Cambridge, Mass., www.eink.com), or other suitable technology for reducing the power consumption of information displayed on the display(s) 535.

Email Server Component(s) 536, which, for example, may be configured or designed to provide various functions and operations relating to email activities and communications.

Web Server Component(s) 537, which, for example, may be configured or designed to provide various functions and operations relating to web server activities and communications.

Messaging Server Component(s) 538, which, for example, may be configured or designed to provide various functions and operations relating to text messaging and/or other social network messaging activities and/or communications.

Etc.

In at least one embodiment, the Tote Note Application may be configured or designed to provide automatic assistance to users who make frequent calls on their mobile devices and are frequently on the road or unable to make call notes during their conversations, such as sales people, executives, consultants, assistants, etc. In one embodiment, a Tote Note may be sent directly to a user's email inbox, and may include an MP3 audio attachment of the user's audio notes as well as a text transcription of the user's audio notes within the email body. In at least one embodiment, the email subject line may include various information such as, for example, the name and phone number of the person with whom the user spoke, timestamp information, etc. Users may also manually initiate recording of a new Tote Note at the user's mobile communication device. For corporate users, one or more Tote Note APIs are available to integrate with CRM software and/or other types of $3^{rd}$ party systems/software.

FIGS. 10-21 illustrate example screenshots of various GUIs which may be used for facilitating activities relating to one or more of the Automated Notation aspects disclosed herein. In at least one embodiment, at least a portion of the GUIs may be configured or designed for use at one or more mobile devices.

Figure 10:
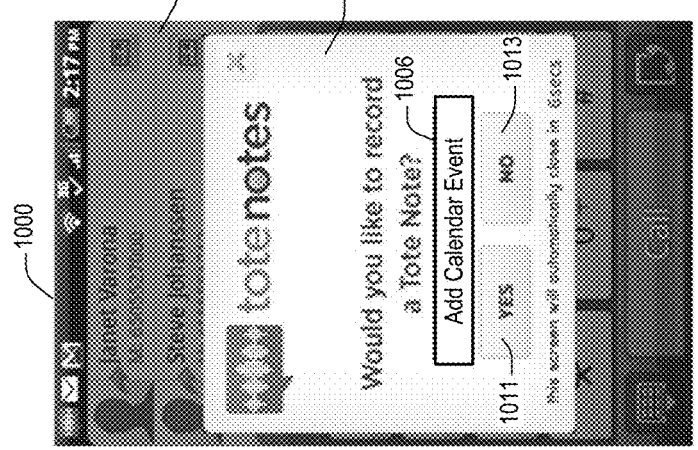

FIG. 10 shows an example screenshot of an Automated Tote Note User Prompt GUI in accordance with a specific embodiment. In at least one embodiment, the Tote Note Application may continuously or periodically monitor events/conditions at the user's mobile communication device in order to detect the occurrence of one or more triggering events/conditions which may cause the Tote Note Application to automatically display Tote Note User Prompt GUI portion 1002 at the user's device. For example, according to different embodiments, one or more different threads or instances of the Tote Note Application may be initiated in response to detection of one or more conditions or events satisfying one or more different types of minimum threshold criteria for triggering display Tote Note User Prompt GUI portion 1002. Various examples of conditions or events which may trigger display of the Automated Tote Note User Prompt GUI of FIG. 10 may include, but are not limited to, one or more of the following (or combinations thereof):
  end of phone call event;
  email send event;
  email receive event;
  text message send event;
  text message receive event;
  time related criteria (e.g., only display of Automated Tote Note User Prompt GUI between 9 am-5 pm);
  day/date related criteria (e.g., only allow display of Automated Tote Note User Prompt GUI between Mon-Fri; only allow display of Automated Tote Note User Prompt GUI—see, e.g., FIG. 19);
  contact related criteria (e.g., only allow display of Automated Tote Note User Prompt GUI for specific contacts pre-selected by the user), including, but not limited to, one or more of the following (or combinations thereof):
  Specific contact name;
  Specific contact organization/company/business;
  Specific industry;
  Specific phone number (checked against a database);
  User-specified list (i.e. "PTA members" or "Sales Team");
  Area code;
  call duration criteria (e.g., only allow display of Automated Tote Note User Prompt GUI if call duration exceeds minimum threshold amount of time T such as, for example, T>10 seconds);
  call frequency criteria (e.g., only allow display of Automated Tote Note User Prompt GUI if the call frequency for a given phone number exceeds a predetermined threshold value (TH), such as, for example, TH≥2; Total number of incoming or outgoing calls (e.g., greater than "x"), etc.);
  call type criteria (e.g., only allow display of Automated Tote Note User Prompt GUI if the call type matches one or more specified call types such as, for example, one or more of the following (or combinations thereof): incoming calls, outgoing calls, failed calls, successfully ended calls, etc.);
  voicemail receipt event (e.g., only allow display of Automated Tote Note User Prompt GUI for a given call event if a voicemail has been received in association with that call event);
  and/or other types of events, conditions and/or criteria which may be defined or specified by the user (e.g., using different types of business rules such as regular expressions, etc.).

As illustrated in the example embodiment of FIG. 10, if the Tote Note Application has detected a set of conditions/events satisfying minimum threshold criteria for triggering display Tote Note User Prompt GUI portion 1002, it may automatically display the Tote Note User Prompt GUI portion 1002 at the mobile communication device's display for a predetermined time interval (e.g., such as 6 seconds, or a different value which may be defined the user), thereby prompting the user to initiate recording of a Tote Note, if desired by the user. In at least one embodiment, if the user desires not to initiate recording of a Tote Note, the user may provide input (e.g., tapping "NO", tapping on "X", verbally stating "NO", etc.) to close the displayed Tote Note User Prompt GUI portion 1002. In at least one embodiment, the user may desire to create a related calendar event (e.g., by tapping on 'Add Calendar Event" button 1006) rather than (or in addition to) recording a Tote Note.

In at least one embodiment, if the user desires to initiate recording of a Tote Note, the user may provide input (e.g., tapping "YES", verbally stating "YES", etc.) to cause the Tote Note Application to initiate recording of a new Tote Note to be associated with the recently detected set of conditions/events.

Figure 11:
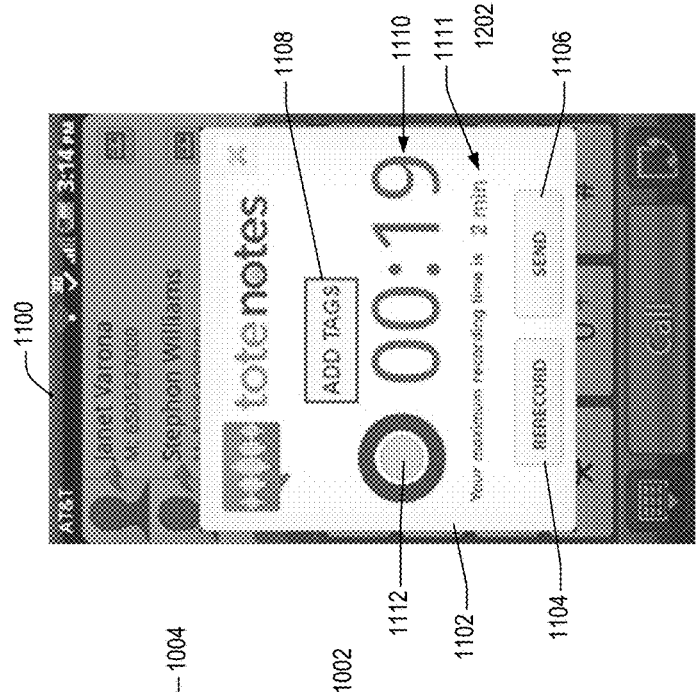

FIG. 11 shows an example screenshot of a Tote Note Recording GUI in accordance with a specific embodiment. In at least one embodiment, as part of the process of initiating recording of a new Tote Note, the Tote Note Application may display Tote Note Recording GUI portion 1102 at the user's mobile communication device to facilitate the user and recording of the new Tote Note. For example, as illustrated in the example embodiment of FIG. 11, Tote Note Recording GUI portion 1102 may include one or more of the following features, objects, and/or content (or combinations thereof):

- Tote Note record/pause button 1112 which, for example, may be toggled by the user to pause and/or commence recording of the new Tote Note;
- Re-record button 1104 for initiating re-recording of the new Tote Note;
- Send button 1106, which, for example, may be tapped by the user to indicate to the Tote Note Application that the user has completed recording of the new Tote Note, and now desires to finalize and send the new Tote Note;
- Elapsed recording time content 1110, which, for example, may track the total time length of the new Tote Note which is being recorded;
- Maximum recording time content 1111, which, for example, may display the maximum total amount of recording time available for recording of the new Tote Note;
- Add Tag button 1108, which, for example, may be configured or designed to enable the user to tag the new Tote Note with one or more tags selected by the user. In at least one embodiment, if the user taps the ADD TAGS button, 1108, the Tote Note Application may respond by displaying a Tote Note Tagging GUI (not shown) which is configured or designed to enable the user to associate the new Tote Note with one or more predefined tags (e.g., dynamically suggested) and/or one or more tags which may be manually input by the user.

In at least one embodiment, the audio portion of the new Tote Note may be record locally at the mobile communication device (e.g., using the device's microphone), and may be stored temporarily in local memory of the mobile communication device. According to different embodiments, the audio portion of the new Tote Note may be recorded and saved in a variety of different audio formats such as, for example, MP3, WAV, ACC, FLAC, OGG, FLASH, etc. In some embodiments, the Tote Note Application may continue recording and caching the audio portion of the new Tote Note in local memory of the mobile communication device, and may asynchronously upload the new Tote Note audio file to the Automated Notation Server System after the user taps the Send button 1106. Alternatively, in other embodiments, the Tote Note Application may commence streaming of the audio portion of the new Tote Note to the Automated Notation Server System (and/or other remote transcription service) in real-time, as the mobile communication device captures the audio content from the user.

Figure 12:
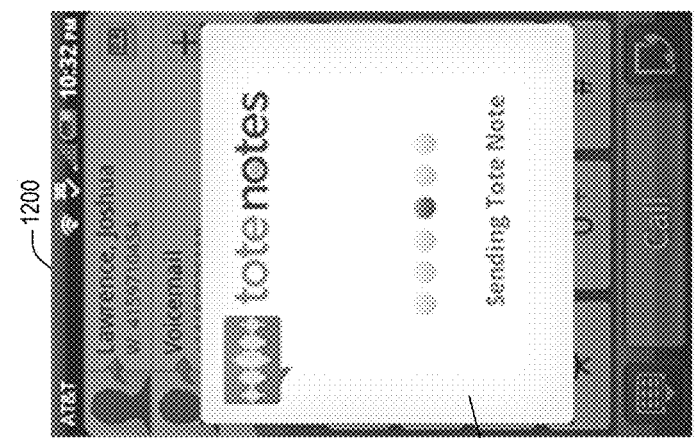

FIG. 12 shows an example screenshot of a Tote Note Processing GUI in accordance with a specific embodiment. In at least one embodiment, the Tote Note Application may be displayed in response to the user tapping the SEND button 1106 (FIG. 11).

FIGS. 13-15 show example screenshots of various Tote Note User Options/Preferences GUIs in accordance with a specific embodiment. In at least one embodiment, the Tote Note User Options/Preferences GUIs may be configured or designed to enable the user to configure various types of options and/or preferences associated with the Tote Note Application such as, for example, one or more of the following (or combinations thereof):

- Always Active (1302): check this box if the user wants the Tote Note Application to enable running of the Tote Note Application (e.g., including running in background) at all (or desired) times.
- Active Hours (1304)—User may configure this setting to set the times when The Tote Note Application is be active on a user's mobile device. During active hours, the user will receive a prompt at the end of one or more call asking "Would the user like to record a Tote Note?" The user may tap YES, or NO, or the box may disappear by itself after a few seconds. (See the "Timer Settings" section for more information about the pop-up box.). For example, the user may configure the Tote Note Application to be active only at certain times, as determined (and customized) by the user. If the user wants The Tote Note Application to be active only during business hours (8 AM to 6 PM Monday through Friday), the user may check the box at 1304.
- Dialog Box Time Limit (1310) refers to the length of time that the Tote Note User Prompt GUI dialog box is to be displayed on the mobile communication device (e.g., after a call end event is detected). In at least one embodiment, the user may operate the slider at 1310 to set this timer between 2 and 10 seconds. Some users prefer to set this at around 5-6 seconds.
- Max Recording Time is the maximum length of time for a single Tote Note. In at least one embodiment, this value may be customizable by the user. In other embodiments, this value may be set or determined by other conditions such as, for example, the type of Tote Note subscription service associated with the users account. For example, a FREE version of the Tote Note subscription service may allow the user to set the timer up to a maximum of 30 seconds (note: in at least one embodiment, the user may also have an extra second or two after 30 seconds if needed). In at least one embodiment, a PRO version of the Tote Note subscription service may allow the user to set the timer up to a maximum of 2 full minutes per Tote Note.
- Outgoing Email Settings (not shown)—In at least one embodiment, the Tote Note Application may be configured or designed to use a user's web-based email address to send one or more Tote Notes. Examples of some of the more common e-mail services include, for example, Gmail, Yahoo Mail, Hotmail, Windows Live, etc.
- Outgoing Email Address—In at least one embodiment, the user may enter the "FROM" email address to be used for identifying the source or origin of Tote Note e-mail messages created by and/or sent by the user.
- Destination Email Address (1404, FIG. 14)—in at least one embodiment the user may provide a "TO" email address to be used for delivering Tote Note e-mail messages such as those created by and/or sent by the user.

Secondary Email Address (1410)—In at least one embodiment, a user's Tote Note to be sent to another email address, in addition to the primary destination address. For example, the user may elect to "cc" an assistant on Tote Note activities to allow the assistant to be timely updated about important call details, etc. In at least one embodiment, the secondary e-mail address functionality may be only available in the PRO Version of Tote Notes.

FIGS. 16-19 show example screenshots of various Tote Note Automated Set-Up GUIs in accordance with a specific embodiment. In at least one embodiment, the Tote Note Application may The Tote Note Application may be configured or designed to allow the user to complete the initial setup of the application in less than 30 seconds. At initial startup, a user may be led through an automated Tote Note Setup Wizard, where the user is automatically prompted for desired input information. Example screenshots of the automated Tote Note Setup Wizard are illustrated in FIGS. 16-19.

Figure 20:
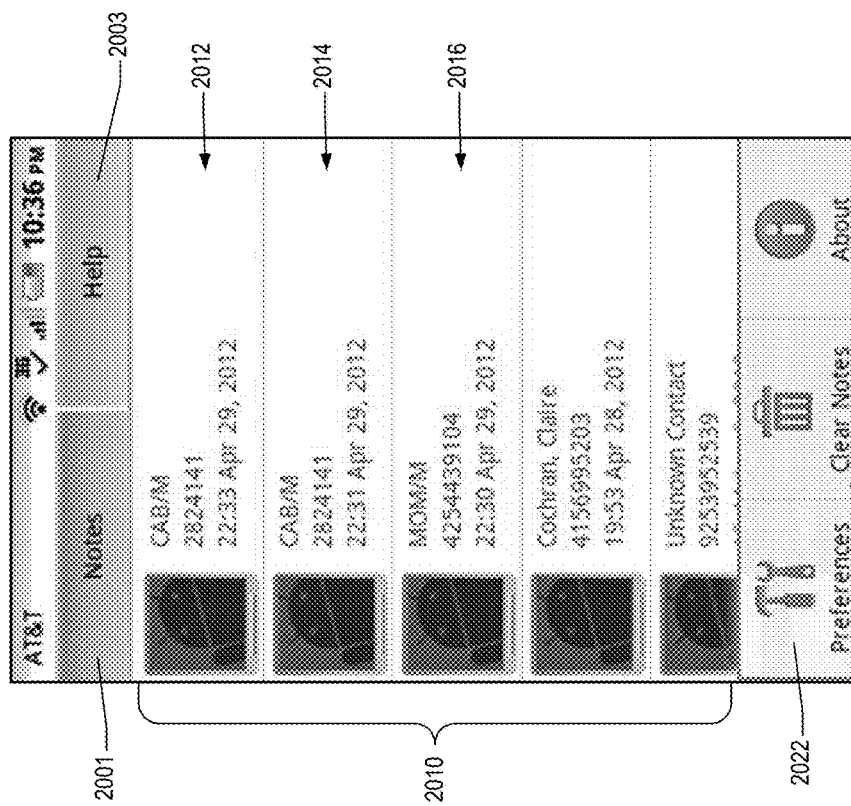

FIG. 20 shows an example screenshot of a Tote Note History GUI in accordance with a specific embodiment. As illustrated in the example embodiment of FIG. 20, the Tote Note History GUI may include a variety of different content and/or features such as, for example, one or more of the following (or combinations thereof):

Tote Note History Tab 2001;
Tote Note Help Tab 2003;
Tote Note History information 2010, which, for example, may include a log of individual records (e.g., 2012, 2014, 2016) relating to previously created Tote Notes.
Tote Note Preferences button 2022 for providing a user with access to the Tote Note Application preferences and/or options;
Clear Tote Notes history button 2024;
etc.

Figure 21:
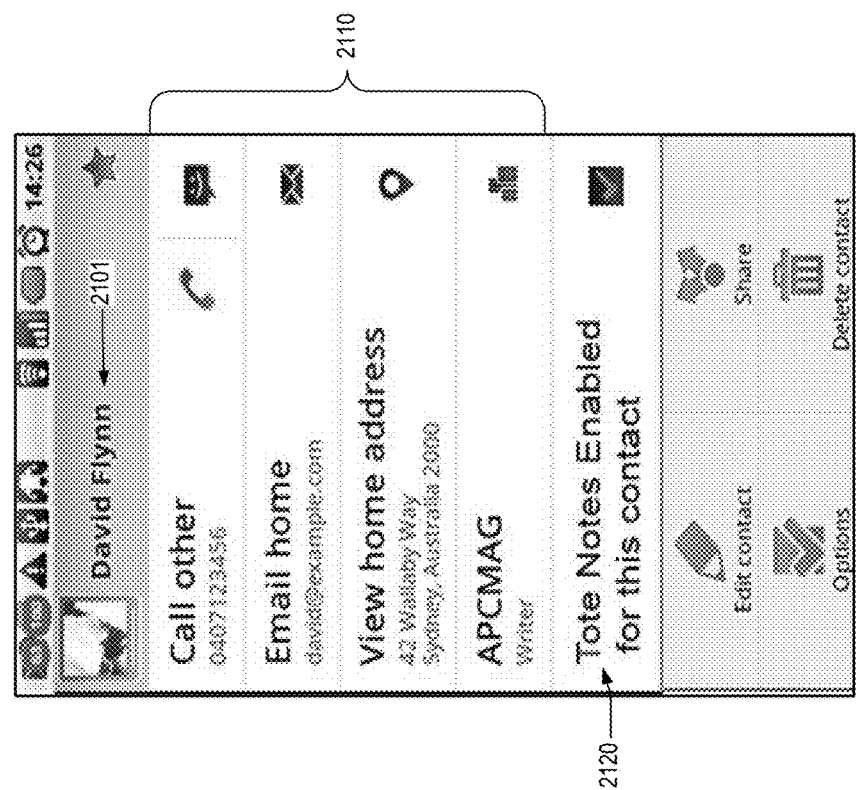

FIG. 21 shows an example screenshot of a Tote Note Contact GUI in accordance with a specific embodiment. As illustrated in the example embodiment of FIG. 21, the Tote Note Contact GUI may include a variety of different content and/or features such as, for example, one or more of the following (or combinations thereof):

Contact Name information 2101;
Other types of contact-related information 2110 (e.g., phone numbers, email addresses, postal addresses, work-related information, etc.);
Tote Note Contact Enable/Disable GUI 2120 which, for example, may be configured or designed to allow a user to selectively enable/disable Tote Note functionality on a per contact basis. For example, as illustrated in the example embodiment of FIG. 21, the user may selectively enable (or disable) implementation of automated Tote Note functionality in connection with events relating to contact information associated with David Flynn (2101). In some embodiments, the Tote Note Application may also be configured or designed to enable a user to selectively enable/disable Tote Note functionality for selected groups of contacts such as, for example, friends, relatives, business associates, etc.

FIG. 22 shows an example screenshot of a different embodiment of a Tote Note User Prompt GUI 2200. For example, in at least one embodiment, at the conclusion of a call, the Tote Note Application may automatically display Tote Note User Prompt GUI 2200, which may prompt the user to perform one or more additional activities, if desired. For example, as illustrated in the example embodiment of FIG. 22, the Tote Note User Prompt GUI 2200 may prompt the user to initiate or perform one or more of the following actions/activities (or combinations thereof):

Send a copy of the user's latest Tote Note to someone else (2212). In one embodiment, the user may select this option to send a copy of the most recent Tote Note to another party, database, email address, text message destination, or other method of electronic messaging. In one embodiment, the user may be able to augment the original Tote Note prior to sending.
Send a Call Log Summary to the most recent person in the mobile communication device's call history (e.g., Janet Varona) (2214).). In one embodiment, the user may select this option to send a call log summary that may be comprised of metadata to another party, database, email address, text message destination, or other method of electronic messaging to the person with whom the user just spoke. For example, to convey time spent on the call for billing or invoicing purposes.
Record and Send a new Tote Note to someone (2216). In one embodiment, the user may select this option to record and send a new Tote Note to an intended recipient.
Add additional content to an existing Tote Note (2218). In one embodiment, the user may select this option to augment or append to a previously sent Tote Note. In one embodiment, a user could select a Tote Notes that was previously sent and stored in the Cloud, which could be appended, or re-sent, or sent to another contact, or delete as needed.
Perform another Tote Note activity (2220).). In one embodiment, the user may select this option to initiate or perform other possible actions which the Tote Note Application may anticipate that the user might want to do in response to different detected events/conditions such as, for example: end of call, dropped call, missed call, end of voicemail playback, etc. For example, in one embodiment, if the Tote Note Application detects a dropped call event, it might ask the user if he wants to (a) record and send a Tote Note to the dropped caller; (2) send dropped caller a pre-written message such as "Will call you back shortly when there's better cell phone reception"; (3) set a reminder to call the dropped caller back; etc. Other Tote Note activities may include, but are not limited to, one or more of the following (or combinations thereof): add a calendar item, update a social media status, use voice commands to open other software applications (such as a mapping function when the user speaks "where is Café Claude", or interfaces with another type of digital assistant software to answer user inquiries "what is the probability of rain today").

Figure 6:
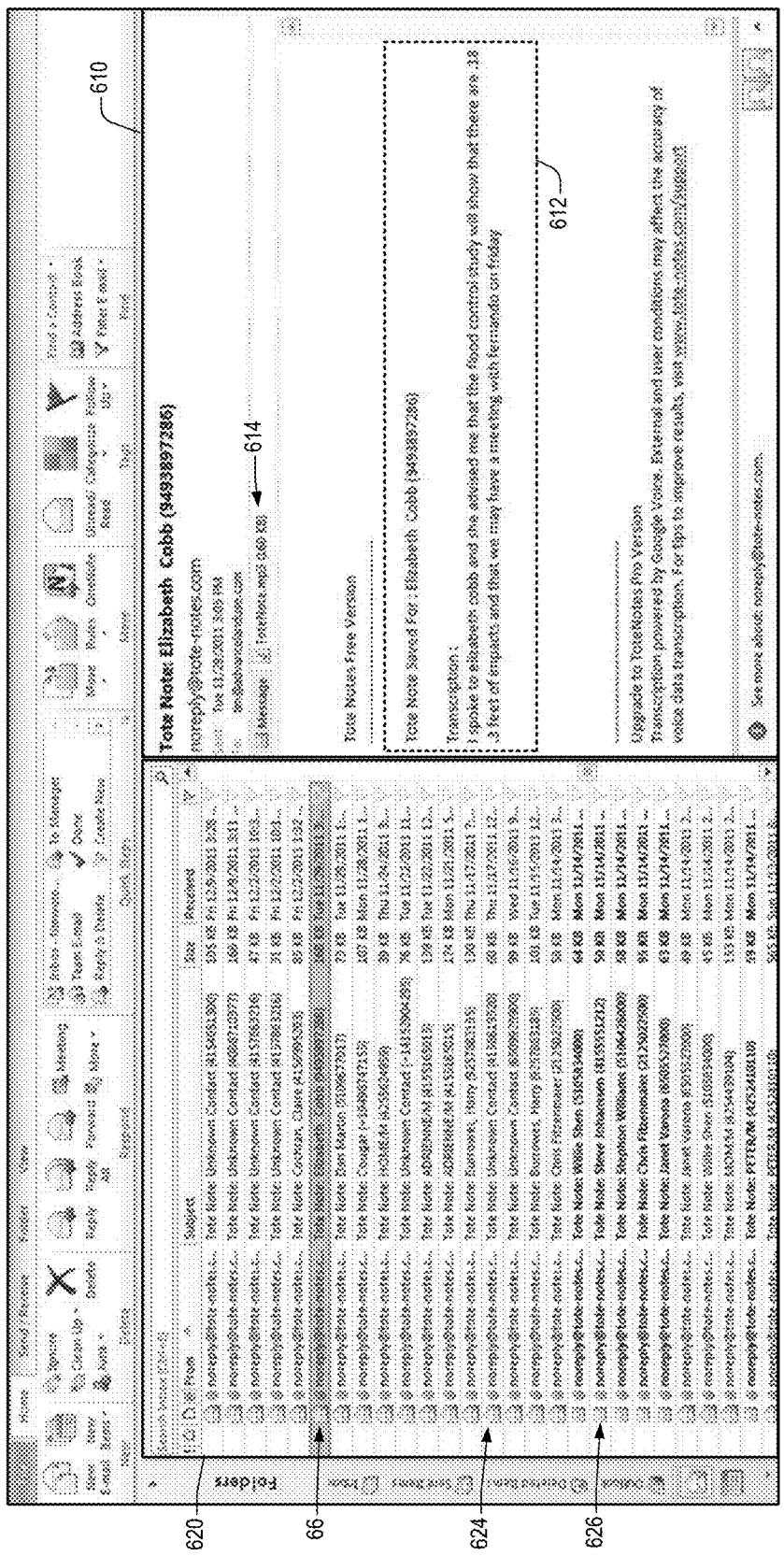
FIG. 6 shows an example screenshot of an email interface 600 in accordance with a specific embodiment.

FIG. 6 shows an example screenshot of an email interface 600 in accordance with a specific embodiment. As illustrated in the example embodiment of FIG. 6, the email interface 600 includes an inbox display portion 620 which displays content relating to a plurality of different Tote Note email message records (e.g., 622, 624, 626, etc.). In at least one embodiment, each Tote Note email message record may include information relating to a respective Tote Note creation event which, for example, was recorded at the user's mobile communication device. For example, as illustrated in the example embodiment of FIG. 6, Tote Note email message record 622 includes a subject line 623 which includes content relating to various information such as, for example, the name and phone number of the person with whom the user spoke, timestamp information, etc. Tote Note email message record 622 also includes an audio attachment (e.g., 614) of the user's audio notes relating to the call (as identified in the subject line), as well as a text transcription (e.g., 612) of the users audio notes within the email body.

Example Procedures and Flow Diagrams

Figure 7:
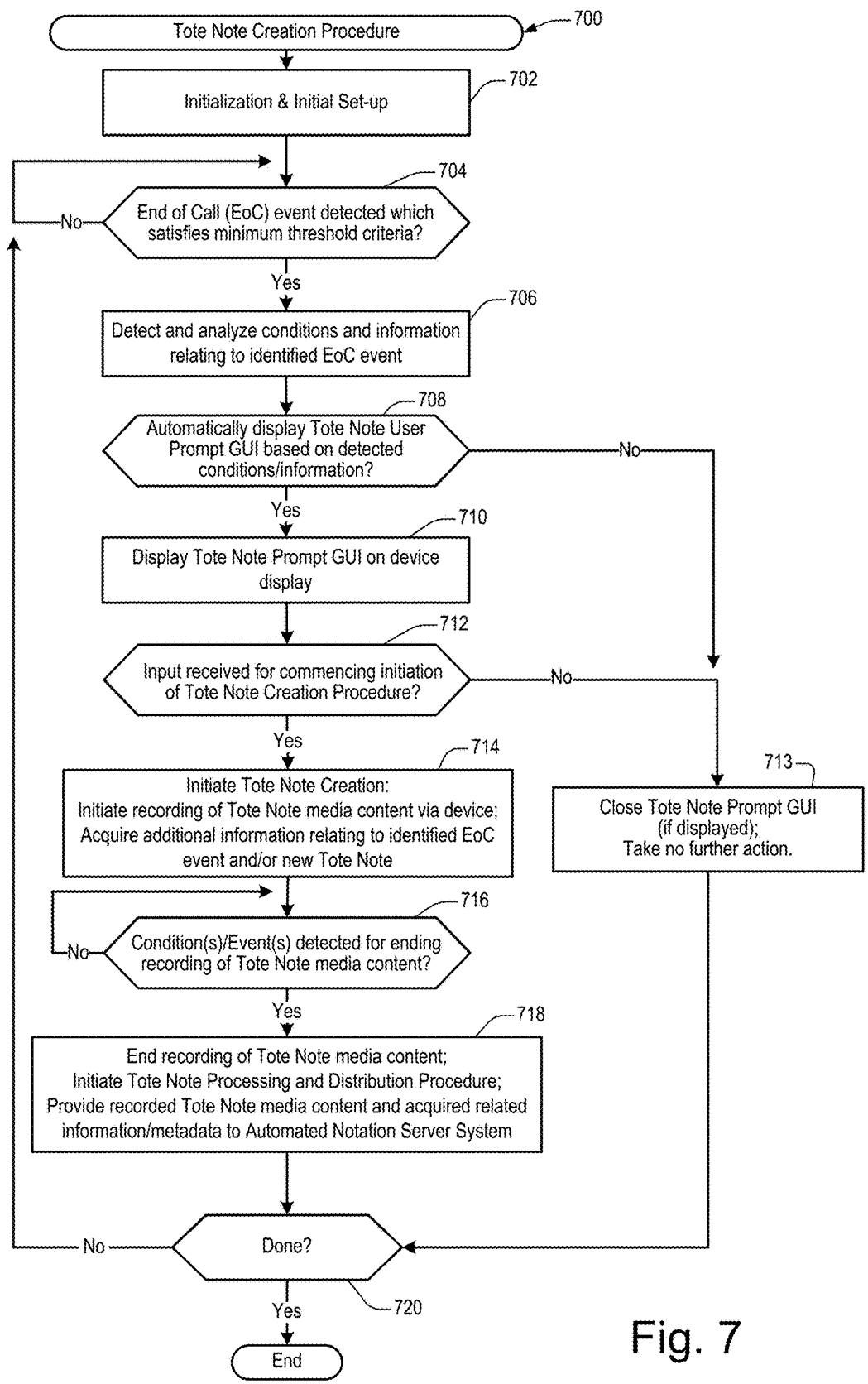
FIGS. 7-8 illustrate various example embodiments of different Automated Notation System procedures and/or procedural flows which may be used for facilitating activities relating to one or more of the Automated Notation System aspects disclosed herein.
Figure 8:
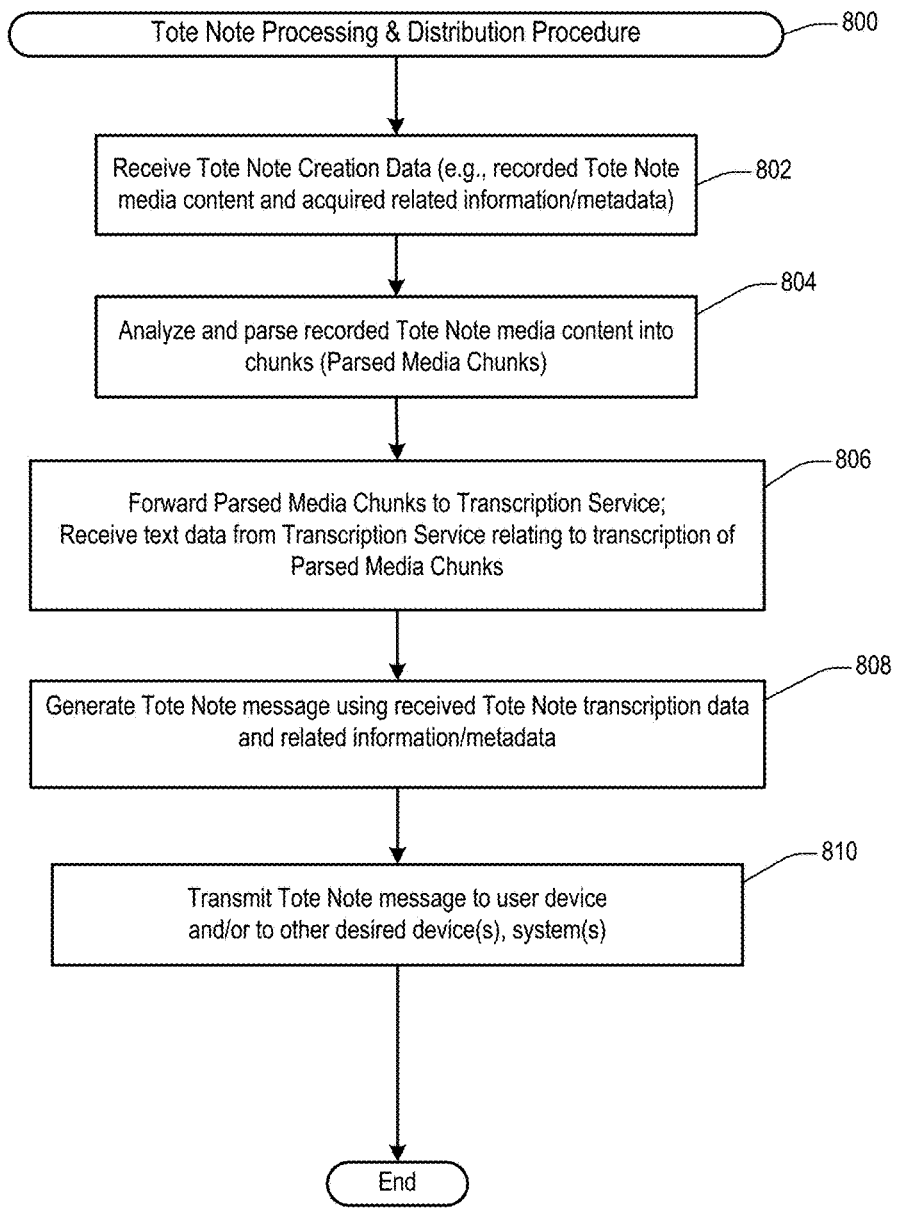

FIGS. 7-8 illustrate various example embodiments of different Automated Notation System procedures and/or procedural flows which may be used for facilitating activities relating to one or more of the Automated Notation System aspects disclosed herein.

According to different embodiments, at least a portion of the various types of functions, operations, actions, and/or other features provided by the Automated Notation System Procedures of FIGS. 7-8 may be implemented at one or more client systems(s), at one or more server systems (s), and/or combinations thereof.

In at least one embodiment, one or more of the Automated Notation System procedures may be operable to utilize and/or generate various different types of data and/or other types of information when performing specific tasks and/or operations. This may include, for example, input data/information and/or output data/information. For example, in at least one embodiment, the Automated Notation System procedures may be operable to access, process, and/or otherwise utilize information from one or more different types of sources, such as, for example, one or more local and/or remote memories, devices and/or systems. Additionally, in at least one embodiment, the Automated Notation System procedures may be operable to generate one or more different types of output data/information, which, for example, may be stored in memory of one or more local and/or remote devices and/or systems. Examples of different types of input data/information and/or output data/information which may be accessed and/or utilized by the Automated Notation System procedures may include, but are not limited to, one or more of those described and/or referenced herein.

In at least one embodiment, a given instance of the Automated Notation System procedures may access and/or utilize information from one or more associated databases. In at least one embodiment, at least a portion of the database information may be accessed via communication with one or more local and/or remote memory devices. Examples of different types of data which may be accessed by the Automated Notation System procedures may include, but are not limited to, one or more of those described and/or referenced herein.

According to specific embodiments, multiple instances or threads of the Automated Notation System procedures may be concurrently implemented and/or initiated via the use of one or more processors and/or other combinations of hardware and/or hardware and software. For example, in at least some embodiments, various aspects, features, and/or functionalities of the Automated Notation System procedures may be performed, implemented and/or initiated by one or more of the various systems, components, systems, devices, procedures, processes, etc., described and/or referenced herein.

According to different embodiments, one or more different threads or instances of the Automated Notation System procedures may be initiated in response to detection of one or more conditions or events satisfying one or more different types of minimum threshold criteria for triggering initiation of at least one instance of the Automated Notation System procedures. Various examples of conditions or events which may trigger initiation and/or implementation of one or more different threads or instances of the Automated Notation System procedures may include, but are not limited to, one or more of those described and/or referenced herein.

According to different embodiments, one or more different threads or instances of the Automated Notation System procedures may be initiated and/or implemented manually, automatically, statically, dynamically, concurrently, and/or combinations thereof. Additionally, different instances and/or embodiments of the Automated Notation System procedures may be initiated at one or more different time intervals (e.g., during a specific time interval, at regular periodic intervals, at irregular periodic intervals, upon demand, etc.).

In at least one embodiment, initial configuration of a given instance of the Automated Notation System procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Automated Notation System procedures may correspond to and/or may be derived from the input data/information.

FIG. 7 shows an example of a Tote Note Creation Procedure 700 in accordance with a specific embodiment. In at least one embodiment, at least a portion of the actions and/or operations implemented and/or initiated by the Tote Note Creation Procedure may be performed by the Tote Note Application running on the user's mobile communication device.

As illustrated in the example embodiment of FIG. 7, at 702 initialization & initial set-up of the Tote Note Application may be performed.

In at least one embodiment, at 704, a determination may be made as to whether or not a set of condition(s) and/or event(s) has been detected which meet or exceed a minimum set of threshold criteria. For example, as illustrated in the example embodiment of FIG. 7 at 704, a determination may be made as to whether or not an End of Call (EoC) event has been detected which satisfies minimum threshold criteria. According to different embodiments, examples of such minimum threshold criteria may include, but are not limited to, one or more of the following (or combinations thereof): which may be defined for triggering which may trigger display of the Automated Tote Note User Prompt GUI of FIG. 10 may include, but are not limited to, one or more of the following (or combinations thereof):
- time related criteria;
- day/date related criteria;
- contact related criteria such as, for example, one or more of the following (or combinations thereof):
  - Specific contact name;
  - Specific contact organization/company/business;
  - Specific industry;
  - Specific phone number (checked against a database);
  - User-specified list (i.e. "PTA members" or "Sales Team");
  - Area code;
- call duration criteria;
- call frequency criteria;
- call type criteria;
- and/or other types of events, conditions and/or criteria which may be defined or specified by the user (e.g., using different types of business rules such as regular expressions, etc.).

As illustrated in the example embodiment of FIG. 7, if it is determined that a set of condition(s)/event(s) meets (or exceeds) the specified threshold criteria, one or more response(s) may be initiated, which, for example, may include, but is not limited to, acquiring, detecting and/or analyzing conditions, criteria and/or other information relating to identified EoC event (706).

As illustrated in the example embodiment of FIG. 7, at 708 a determination may be made as to whether or not to automatically display the Tote Note User Prompt GUI based on detected conditions/criteria/information. For example, in at least one embodiment, additional conditions, criteria, and/or other information may be analyzed to determine whether or not such conditions, criteria, and/or information meets or exceeds additional threshold criteria. For example, in one embodiment, after an EoC event has been detected (e.g., at 704), the Tote Note Application may access the mobile communication device's call log in order to acquire (e.g., 706) EoC-related information such as, for example, one or more of the following (or combinations thereof): the duration of the phone call associated with the EoC event, the phone number associated with the EoC event, the date/time when the phone call was initiated, and the date/time when the phone call ended. The Tote Note Application may then analyze the acquired EoC-related information in order to determine (e.g., 708) whether or not the analyzed information meets or exceeds predefined criteria for initiating automatic display of the Tote Note User Prompt GUI.

In at least one embodiment, if it is determined (e.g., at 708) that the Tote Note User Prompt GUI may be automatically displayed at the user's mobile communication device, the Tote Note Creation Procedure may respond by causing the Tote Note User Prompt GUI to be automatically displayed at the mobile communication device. In at least one embodiment, the Tote Note User Prompt GUI may be cause to be automatically displayed at the mobile communication device for a predefined time interval (e.g., 6 seconds).

As shown at 712, the Tote Note Creation Procedure may wait to receive input or confirmation from the user to initiate creation of a new Tote Note, and to begin recording of the Tote Note's audio content. In at least one embodiment, a user may tap on the "YES" button (1011, FIG. 10) of the Tote Note User Prompt GUI to initiate creation of a new Tote Note, and begin recording of the Tote Note's audio content and/or recording of other types of media/content. In at least one embodiment, at least a portion of the recorded Tote Note media content may be stored, at least temporarily, in local memory of the mobile communication device.

In at least one embodiment, as part of the process of creating the new Tote Note, the Tote Note Creation Procedure may also perform one or more additional operations for acquiring additional content, data, metadata, and/or other information relating to identified EoC event (and/or relating to the newly created Tote Note). In at least one embodiment, examples of such additional content, data, metadata, and/or other information may include, but are not limited to, one or more of the following (or combinations thereof):
- contact information (e.g., contact name(s), phone number(s), e-mail address(es), lable(s), etc.);
- picture/image content;
- video content;
- text content;
- call history (or call log) information;
- call duration information;
- user account information;
- user profile information;
- metadata;
- tags (e.g., to be associated with new Tote Note);
- communication history information (e.g., relating to prior communications between user and other parties);
- time/date information;
- etc.

As shown at 712, the Tote Note Creation Procedure may wait to detect one or more condition(s)/event(s) for ending recording of the Tote Note media content. For example, in at least one embodiment, the user may tap on the "SEND" button (1106, FIG. 11) of the Tote Note Recording GUI to indicate to the Tote Note Application that the user has completed recording of the new Tote Note, and desires to finalize and send/upload the new Tote Note.

As illustrated in the example embodiment of FIG. 7, upon detection of one or more condition(s)/event(s) for ending recording of the Tote Note media, one or more response(s) may be automatically initiated which, for example, may include, but are not limited to, one or more of the following (or combinations thereof):
- End recording of Tote Note media content;
- Initiate Tote Note Processing and Distribution Procedure (e.g., FIG. 8);
- Provide (e.g., transmit or upload) recorded Tote Note media content and acquired related content/metadata/information to Automated Notation Server System;
- etc.

It will be appreciated that different embodiments of the Tote Note Creation Procedure (not shown) may include additional features and/or operations than those illustrated in the specific embodiment of FIG. 7, and/or may omit at least a portion of the features and/or operations of the Tote Note Creation Procedure illustrated in the specific embodiment of FIG. 7.

FIG. 8 shows an example of a Tote Note Processing & Distribution Procedure 800 in accordance with a specific embodiment. In at least one embodiment, at least a portion of the actions and/or operations implemented and/or initiated by the Tote Note Processing & Distribution Procedure may be performed by the Automated Notation Server System.

As illustrated in the example embodiment of FIG. 8, at 802, Tote Note Creation Data may be received. In at least one embodiment, the Receive Tote Note Creation Data may include, for example, recorded Tote Note media content and/or additional content, data, metadata, and/or other information relating to an identified EoC event and/or relating to a new Tote Note to be created.

As illustrated in the example embodiment of FIG. 8, at 804, the Tote Note Processing & Distribution Procedure may analyze and parse the received Tote Note media content into chunks ("Parsed Media Chunks"). For example, in one embodiment, the recorded Tote Note media content (received at the Automated Notation Server System), includes recorded audio content which may be analyzed and parsed into chunks. In at least one embodiment, each chunk of parsed content may have an associated time duration which does not exceed a maximum duration value (e.g., max=20 sec) and/or which is within a range of preferred duration values (e.g., preferred chunk duration value range=18 sec-20 sec).

In at least one embodiment, the parsing of the recorded audio content may include analyzing the audio content for gaps of silence (or low audio output), and using at least a portion of the identified "low audio" gaps to parse the audio content into discrete chunks of audio content (e.g., of about 18-20 sec each).

As illustrated in the example embodiment of FIG. 8, at 806, the Parsed Media Chunks may be sent to (or forwarded to) a Transcription Service for transcribing the audio chunk files into text. In at least one embodiment, a remote transcription service such as that available via the Google Voice API may be used. In other embodiments, the Automated Notation Server System includes functionality for performing at least a portion of the transcription operations.

In the specific example embodiment of FIG. 8, it is assumed at 806 that the Tote Note Processing & Distribution Procedure receives text data from the Transcription Service relating to transcription of Parsed Media Chunks.

As illustrated in the example embodiment of FIG. 8, at 808, a Tote Note message may be generated using the received Tote Note transcription data and received Tote Note Creation Data, and/or other related information, content, and/or metadata. In at least one embodiment, a text transcription of the audio Tote Note content (and related metadata) may be included as text info in the Tote Note message body. In at least one embodiment, the audio Tote Note content (as well as other types of Tote Note content) may be attached as files to the Tote Note message.

As illustrated in the example embodiment of FIG. 8, at 810, the newly generated Tote Note message may be transmitted (e.g., via email, text, etc.) to user's mobile communication device and/or to other desired device(s)/system(s) such as, for example, the user's specified email server.

In at least one embodiment, one or more copies of the Tote Note message (and its associated media content) may be stored at the Automated Notation Server System and/or other online storage system(s). In at least one embodiment, the Automated Notation Server System may be configured or designed to include functionality to stream text & audio and other media/content to a user's mobile communication device, which may be accessed and presented to a user via the Tote Note Application.

It will be appreciated that different embodiments of the Tote Note Processing & Distribution Procedure (not shown) may include additional features and/or operations than those illustrated in the specific embodiment of FIG. 8, and/or may omit at least a portion of the features and/or operations of the Tote Note Processing & Distribution Procedure illustrated in the specific embodiment of FIG. 8.

It may be appreciated that different embodiments of the Automated Notation Procedure(s) (not shown) may include additional features and/or operations than those illustrated in the specific embodiments explicitly described herein, and/or may omit at least a portion of the features and/or operations of Automated Notation Procedure(s) explicitly described herein.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

I claim:

1. A computer implemented method for automated notation system on a mobile device, the computer implemented method comprising causing at least one processor in the mobile device to execute a plurality of instructions for:
    identifying a set of threshold criteria for causing a display, on the mobile device, of a first user interface prompting a user associated with the mobile device to initiate a procedure at the mobile device, the threshold criteria pertaining to a call event including one of incoming calls, outgoing calls, failed calls, and successfully ended calls;
    determining when an end of the call event has been detected at the mobile device;
    displaying a second interface at the mobile device, when the set of threshold criteria has been satisfied, to allow the user to enter a message related to the call event, wherein the message is in a form of voice, email or text; and
    transmitting the message to a designated destination specified by the user.

2. The computer implemented method as recited in claim 1, wherein the second interface facilitates the user to access a database.

3. The computer implemented method as recited in claim 2, wherein the database is a contact list residing in the mobile device.

4. The computer implemented method as recited in claim 2, wherein the designated destination is a place where the message is retrieved by the user when needed.

5. The computer implemented method as recited in claim 2, wherein the designated destination is a place where the message is retrieved by another user when needed.

6. The computer implemented method as recited in claim 2, wherein the designated destination is an email address.

7. The computer implemented method as recited in claim 6, wherein the email message includes a subject heading automatically populated with information related to the phone call.

8. The computer implemented method as recited in claim 7, wherein the information is a name of a person with whom the call event occurred, date and/or time of the call event.

9. The computer implemented method as recited in claim 1, further comprising transcribing the message into text when the message is in the form of voice.

10. The computer implemented method as recited in claim 1, further comprising initiating an instance to a CRM product.

11. An apparatus comprising:
    at least one processor;
    at least one interface operable to provide a communication link to at least one network device;
    a display screen;
    memory;
    the at least one processor being operable to execute the plurality of instructions stored in the memory, and being operable to operate with the memory and the at least one interface for:
        identifying a set of threshold criteria for causing a display of a first user interface prompting a user operating the apparatus to initiate a procedure on the apparatus, the threshold criteria pertaining to a call event including one of incoming calls, outgoing calls, failed calls, and successfully ended calls;
        determining when an end of the call event has been detected at the apparatus;
        displaying a second interface, when the set of threshold criteria has been satisfied, to allow the user to enter a message related to the call event, wherein the message is in a form of voice, email or text; and
        transmitting the message to a designated destination specified by the user.

12. The apparatus as recited in claim 11, wherein the second interface facilitates the user to access a database.

13. The apparatus as recited in claim 12, wherein the database is a contact list residing in the apparatus.

14. The apparatus as recited in claim 12, wherein the designated destination is a place where the message is retrieved by the user when needed.

15. The apparatus as recited in claim 12, wherein the designated destination is a place where the message is retrieved by another user when needed.

16. The apparatus as recited in claim 12, wherein the designated destination is an email address.

17. The apparatus as recited in claim 16, wherein the email message includes a subject heading automatically populated with information related to the phone call.

18. The apparatus as recited in claim 17, wherein the information is a name of a person with whom the call event occurred, date and/or time of the call event.

19. The apparatus as recited in claim 11, further comprising transcribing the message into text when the message is in the form of voice.

20. The apparatus as recited in claim 11, further comprising initiating an instance to a CRM product.

* * * * *